(12) United States Patent
Hsu et al.

(10) Patent No.: US 11,014,004 B2
(45) Date of Patent: May 25, 2021

(54) METHOD AND SYSTEM FOR SUPPLEMENTING A VIDEO STREAM OF A FANTASY CARD VIDEOGAME

(71) Applicant: CARDBOARD LIVE, INC., Charlottesville, VA (US)

(72) Inventors: James Chieh-Wei Hsu, Vancouver (CA); Wilson Hunter, Charlottesville, VA (US)

(73) Assignee: CARDBOARD LIVE, INC., Charlottesville, VA (US)

( * ) Notice: Subject to any disclaimer, the term of this patent is extended or adjusted under 35 U.S.C. 154(b) by 0 days.

(21) Appl. No.: 16/930,889

(22) Filed: Jul. 16, 2020

(65) Prior Publication Data

US 2020/0346118 A1 Nov. 5, 2020

Related U.S. Application Data

(63) Continuation-in-part of application No. 16/811,523, filed on Mar. 6, 2020, which is a continuation of application No. 16/537,102, filed on Aug. 9, 2019, now Pat. No. 10,625,163, said application No. 16/930,889 is a continuation-in-part of application No. 16/263,214, filed on Jan. 31, 2019.

(51) Int. Cl.
| | |
|---|---|
| A63F 13/69 | (2014.01) |
| A63F 13/95 | (2014.01) |
| A63F 13/30 | (2014.01) |
| A63F 1/00 | (2006.01) |

(52) U.S. Cl.
CPC .............. *A63F 13/69* (2014.09); *A63F 13/30* (2014.09); *A63F 13/95* (2014.09); *A63F 2001/008* (2013.01)

(58) Field of Classification Search
None
See application file for complete search history.

(56) References Cited

U.S. PATENT DOCUMENTS

| | | | |
|---|---|---|---|
| 10,580,043 B2* | 3/2020 | Publicover | H04N 21/4532 |
| 10,625,163 B1* | 4/2020 | Hsu | A63F 13/352 |
| 2017/0201779 A1* | 7/2017 | Publicover | H04N 21/2668 |

* cited by examiner

*Primary Examiner* — Ronald Laneau
(74) *Attorney, Agent, or Firm* — Bechen PLLC; Timothy Bechen

(57) ABSTRACT

The present invention provides a method and system for supplementing a video stream of a fantasy card videogame, such as an online videogame electronically played between multiple players across a gaming platform, the gameplay being streaming with a streaming platform. The method and system includes receiving card name data from a game log that indicates a fantasy card being played in the game of the video stream. The method and system accesses a marketplace database using the card name data and electronically retrieves card purchase data therefrom, the card purchase data relating to a commercial transaction for a collectible card referenced by the card name data. Therein, the method and system generates an electronic offer display indicating the collectible card and the card purchase data and transmits the offer to a viewer application associated with a streaming application for displaying the electronic offer display in conjunction with the video stream.

20 Claims, 16 Drawing Sheets

METHOD AND SYSTEM FOR SUPPLEMENTING A VIDEO STREAM OF A FANTASY CARD VIDEOGAME

RELATED APPLICATIONS

The present application is a continuation-in-part of and claims priority to U.S. patent application Ser. No. 16/811,523 entitled "METHOD AND SYSTEM FOR SUPPLEMENTING A VIDEO STREAM OF A FANTASY CARD VIDEOGAME" filed Mar. 6, 2020, which is a continuation of U.S. Pat. No. 10,625,163 entitled "METHOD AND SYSTEM FOR SUPPLEMENTING A VIDEO STREAM OF A FANTASY CARD VIDEOGAME" filed Aug. 9, 2019 having an issued date of Apr. 21, 2020.

The present application is also a continuation-in-part of and claims prior to U.S. patent application Ser. No. 16/263,214 entitled "METHOD AND SYSTEM FOR AUGMENTING VIDEO STREAM OF CARD-BASED FANTASY GAME" filed Jan. 31, 2019.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to improving videogame streaming and more specifically to detecting gameplay elements within the stream and generating supplemental content.

BACKGROUND

Fantasy card games, both in real life and videogame versions, continue to grow in popularity. Real life games provide one play competing against another, for example in tournaments. Whereas videogames provide electronic representations of a gaming board and playing fantasy cards from players' decks of cards.

These games have evolved, including large numbers of fantasy cards available for the players' decks. Each card has unique designs and character properties. The game consists of the sequential playing of cards against other players, card characteristics controlling progress within the game. A popular series of fantasy card videogames are Magic: the Gathering® electronic videogames available from a variety of software developers. These fantasy card videogames seek to electronically replicate real-life card games.

Another growing area in game technology is gameplay streaming. In real life gameplay, the games can be captured via a video feed and transmitted (livestream or recording-based) to multiple viewers.

Similarly, viewers can subscribe to various streaming services and watch videogame gameplay. Current streaming technology is passive, viewers simply viewing the streaming content, may be providing written or audio comments. For example, a common streaming platform is Twitch® available from Amazon. Other users may engage multiple systems, such as streaming content and talking with friends via Discord® available from Discord, Inc.

Viewers watching the fantasy card game streams are currently unable to get additional information about the cards being played at any specific moment within the game. Fantasy card information is further complicated by these games having thousands of unique cards, each with unique features. During a typical game, 50 to 75 of these unique cards are in-play.

Viewers also seek to collect or trade in these gaming cards. For example, by owning a particular card, the viewer can later play that specific card in his or her own playing of the fantasy card game. Collection of cards, as well as other collectibles, occurs in both live games and videogame games.

There are current electronic marketplaces for a user to log-in and seek to purchase a card from the marketplace. For example, Card Kingdom, Inc. runs an electronic marketplace for users to sell or purchase fantasy game cards. Another example of purchasing options are gaming conferences or comic-book conferences where players can purchase cards or other collectible in-person from a retailer.

But current sales and marketplace techniques are limited to stand-alone and direct access locations. As online content distribution becomes available, there is a need for supplementing streaming content of a fantasy card game to include marketplace and purchase information to viewers.

BRIEF DESCRIPTION

The present invention provides a method and system for supplementing a video stream of a fantasy card game. The method and system includes electronically receiving gameplay data representing a playing of one or more fantasy cards within the fantasy card game of the video stream. For example, for videogame content, gameplay data can be from a game log. For example, for in-person gameplay video content, data can be from a card detection engine.

The method and system includes receiving card offer data relating to a collectible card of the game, this collectible card available for electronic purchase. The card offer data includes purchasing or other related information associated with the collectible card, for example pricing information and card quality information.

Therein, the method and system generates an electronic offer display indicating the collectible card and the purchase data. The method and system transmits the electronic offer display to a viewer application associated with a streaming application displaying the video stream of the fantasy card game.

A viewer watching the video stream is presented with the electronic offer display. In one embodiment, this electronic offer display can include a link, button, or other user interface element, for the viewer to electronically purchase the collectible card, without disrupting the video stream. The purchase can be performed within the streaming platform or via a third-party commercial marketplace.

The fantasy card game may be a videogame being electronically played by two or more players in a gaming platform, such a livestream of the videogame. The fantasy card game may be an in-person game being transmitted via a camera or other distribution means, such a livestream of the in person game or a distribution of a recorded version of the contest.

For example, a viewer can watch a livestream of two players competing in a videogame competition of Magic the Gathering®, with the livestream visible in a livestream viewer application. As gameplay progresses, card are then made available for purchase. In a videogame feed, the collectible card can be an electronic version, or may be a printed physical version of the card. Varying embodiments provide for different entities offering cards for sale, for example the streaming content provider, one or more game players, the game content provider, a marketplace, a supplemental content provider, etc.

The present method and system processes the gameplay information from the stream, as well as the electronic indication the card is being offered for sale. The method and system then accesses one or more card databases to acquire price and related data. From this, the electronic offer display can be generated, including the price and related information, for example a quality rating applied to a physical card.

In this example, as the primary viewer window shows the livestream fantasy card gameplay, with a complimentary viewer display providing the electronic offer display. The viewer watching the livestream can click or otherwise engage the electronic offer display to purchase the collectible card, without disrupting gameplay.

Varying embodiments provide for further variations, including updating active livestream content to indicate a purchase of the collectible card. Another embodiment can include financial back-end processing for completing the financial transaction using either a dedicated commercial database, or accessing a third-party vendor. In one embodiment, the streamer can receive a commission. In addition to cards, collectibles can include any number of items for example figurines, replicas of weapons, etc. Another example of an item for sale can be a sealed pack, such as a sealed set of cards, wherein a sealed set of cards can be any type of pre-packaged groupings of cards, such as a preconstructed set of cards, for example a starter deck or a specialty collection, or a sealed package of random cards, for example a booster pack.

A better understanding of the disclosed technology will be obtained from the following detailed description of the preferred embodiments taken in conjunction with the drawings and the attached claims.

DETAILED DESCRIPTION

Generally, the invention herein improves a streaming content by dynamic gameplay determination, accessing supplemental data, including marketplace data for collectible versions of items being played within the streaming game, and then supplementing the videogame stream with this supplemental content. The stream viewer can interact with the streaming content to facilitate viewers purchasing collectible items and streamers receiving credit for purchases concurrent with the streaming.

Figure 1:
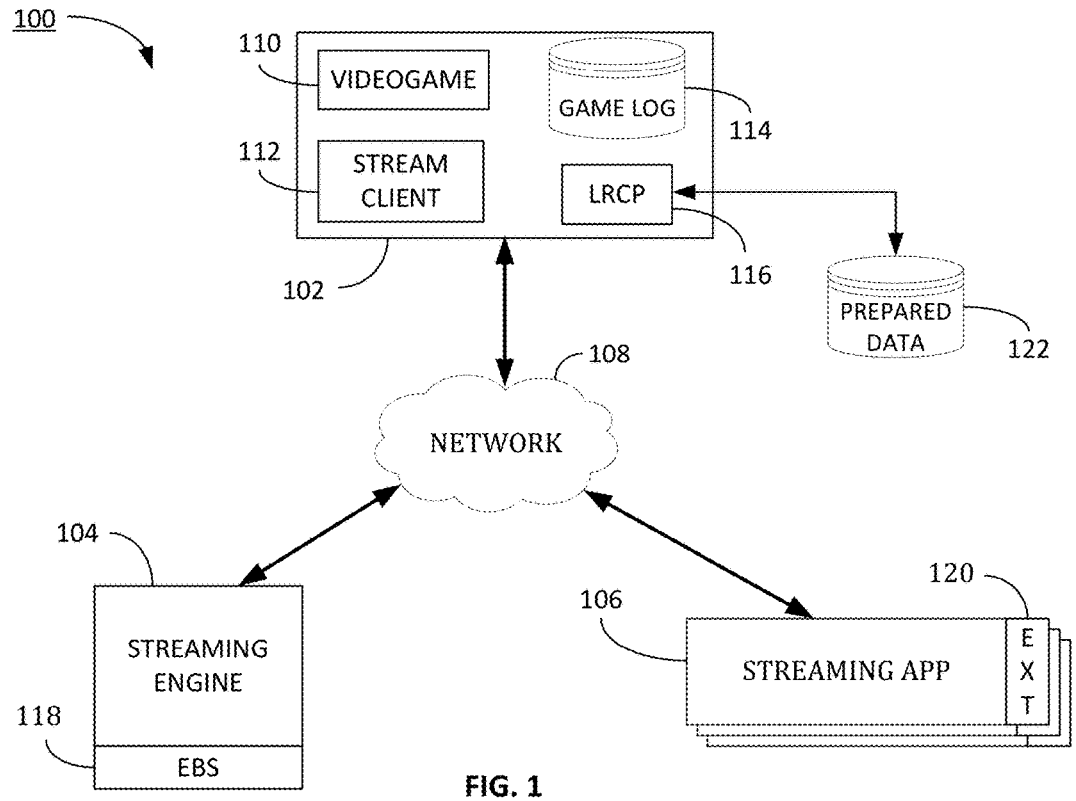
FIG. 1 illustrates a block diagram of a processing system for supplementing a video stream.

FIG. 1 illustrates a block diagram of a system 100 for supplementing a video stream of a fantasy card videogame. The system 100 includes a client device 102, streaming engine 104, and a plurality of streaming applications 106 communicating across a network 108.

The client device 102 can be any suitable gaming device or devices, such as a laptop or personal computer, a video gaming system, a mobile device, etc. The streaming engine 104 can be any suitable engine or engines providing video streaming or any similar type of video or content distribution. In one embodiment, the streaming engine 104 may be the Twitch® server accessible using known techniques for streaming content.

The streaming applications 106 are executable applications disposed on viewer devices. Consistent with known technology, viewers download and run streaming applications to view streaming content. In one embodiment, the streaming application may be from the Twitch® platform allowing for receipt and viewing of streaming content.

In the system 100, the client device 102 executes a videogame 110, such as a fantasy card videogame. The videogame 110 may be a locally-stored executable program, such as being run from local memory. The videogame 110 may also be a game stored on a disc or cartridge loaded into a gaming slot (not shown). In another embodiment, the videogame 110 may be a cloud-based or network-based executable game with an interface for player interaction.

As noted herein, a fantasy card videogame is an electronic game using a deck of electronic game cards, the cards having characters or gameplay elements disposed thereon. The game advances by players playing specific cards and the characteristics associated with the characters or gameplay elements advance the game. A fantasy card videogame expressly excludes any card-based game using a standard 52 or 54 card deck, having four defined suits of hearts, diamonds, spades, and clubs. By way of example, a fantasy card videogame can be a version of games using Magic the Gathering® cards but would not include games of poker, blackjack, cribbage, or other playing-card games using the standard 52/54 card deck.

The device 102 further includes a streaming client 112. Consistent with known technologies, the streaming client 112 may be a locally-executed application facilitating communication with the streaming engine 104 and distribution of the streaming content. In one example, a user can enable the streaming client 112 to duplicate a video output feed for distribution to the streaming engine 104 and subsequent distribution to viewers (via the streaming applications 106). The streaming client 112 may include additional user information for streaming, such as user id, security information, contact information, content distribution list, etc.

Within the client device 102, a game log 114 collects gameplay data generated by the videogame. Gameplay data includes any information relating to gameplay within the videogame 110. For example, gameplay data includes the names and identifiers of players, the type of game being played, decks of electronic cards for each player, general game cards, placement (or play) of cards within the game, including sequence of card play. The gameplay data is a log of activities occurring within the game. For example, if the game includes multiple players, the streaming engine 104 pulls the data from the player running the game and streaming engine, also recording the plays and game log data of player two.

The client device 102 further includes a log-reader client program (LRCP) 116. This program, in one embodiment, is a downloadable executable program running on the client device 102. Whereas, in other embodiments, the LRCP does not require placement within the client device, but rather accesses the game log for retrieving and distributing gameplay data as described herein.

The streaming engine 104 includes an additional processing element, an extension back-end service (EBS) module 118. The EBS 118 is a software module executing either on the same server as the streaming engine 104 or in another cloud-based execution environment. As described in greater detail below, the EBS 118 supplements the livestream feed.

In the system 100, the streaming applications 106 further include additional executables, extensions 120. The extensions 120 can operate as a plug-in with the streaming application, providing a viewer application for displaying supplemental content.

Digital collectible card games, such as videogame 110, typically contain 1500-2000 unique cards in each games' card pool. Of those, about 50 are active and in-play during any typical game. The system 100 enables supplementing the game play video stream with specific card information.

Therefore, based on the large amount of electronic gaming cards, a prepared dataset 122 includes supplemental data. In FIG. 1, the dataset 122 is illustrated as a stand-alone database, such as accessible via a networked connection. In another embodiment, the dataset 122 may be locally disposed with the client device 102 or in any other suitable location.

The prepared dataset 122 includes electronic card data, from public and/or private data sources (not shown). For example, one source may be image databases, for example images available from scryfall.com, the card image search engine. Another exemplary source may be Gatherer, another Magic Card database. Other sources may include proprietary text or image databases for specific cards, or for example user-generated information for cards.

In one embodiment, the prepared dataset 122 is hosted on a third party service platform for direct access by LRCPs 116 executed on client devices 102. The third party service can generate specific electronic gaming card content for supplementing the streaming content as described herein.

In one embodiment, a user installs or loads the fantasy card videogame 110 on his or her local computing/gaming device 102. As the user plays the videogame, the execution of the game generates the gameplay data stored in the game log 114. The user additionally installs the streaming client 112. For example, the streaming client 112 may be applications available from StreamLabs® OBS.

In one embodiment, the LRCP 116 is installed by the user on the client device 102. The LRCP 116 runs independent of the videogame 110, reading and interpreting the game log. The LRCP 116 then retrieves the supplemental data from the prepared dataset 122 based on interpreting the game log. The LRCP 116 transmits the gameplay information and supplemental content to the EBS 118 running in conjunction with the streaming engine 104.

In one embodiment, the game log, also referred to as a game file, is a simple text file fulfilled with the "event object" in JSON format. The LRCP 116 can read the log file in a loop, detecting when content changes. Upon change detection, the LRCP 116 processes the new information by decoding data into a program-readable format, processes the decoded data, and updates a game state representation variable within the LRCP 116. The system then uses this updated game-state representation to communicate with the EBS 118 via an API. As described in greater detail herein, the LRCP 116 further includes the supplemental data to compliment the updated game-state representations in communicating with the EBS 118.

A viewer viewing the streaming content installs and runs the extension 120 on his or her viewing device. For example, the viewer viewing the streaming content on a personal computing device running the streaming application 106 can run the extension 120 as a plug-in or extension to the application 106. In one embodiment, the extension 120 is a web plug-in, enabled by the viewer via account settings associated with the streaming application 106. As noted further below, the extension 120 is a viewer application that in one embodiment uses an overlay interface for providing the supplemental content to the viewer.

Figure 2:
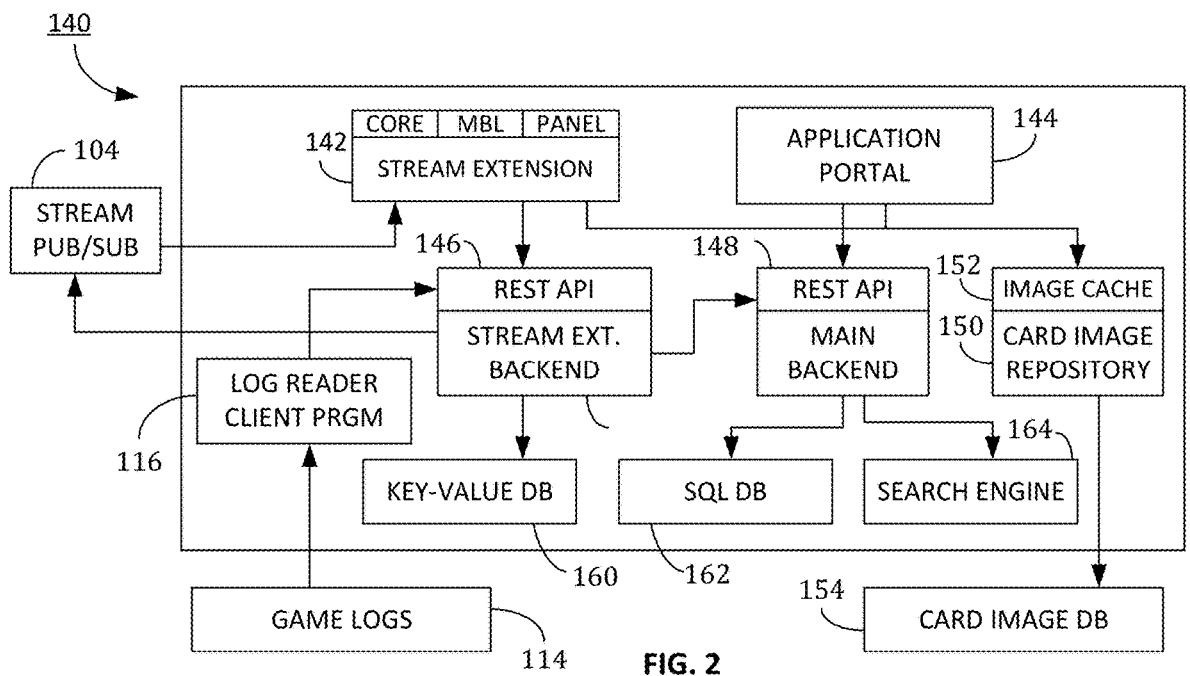
FIG. 2 illustrates a block diagram of one embodiment of an architecture for supplementing a video stream.

FIG. 2 illustrates an architecture diagram 140 with multiple computing resources. The resources include a stream extension 142 and application portal 144. These are user facing elements facilitating engagement and interaction.

The stream extension receives incoming data from the streaming engine 104. The extension 104 can further include a core processing module, a mobile processing module, and a panel module. The application portal 144 adds further information and user output to supplement the streaming content.

The architecture 140 includes three backend processing elements, including the streaming extension backend 146, the main backend 148, and the card image repository 150. The stream extension backend 146 generates output to the stream engine 104 based on the output from the extension 142. Additionally, the extension backend 146 transmits a signal to the main backend 148.

Both backend processing elements 146 and 148 include an application program interface for communication and data exchange. In this exemplary embodiment, the backend processing element with API processing modules 146 and 148 can utilize a representative state transfers directed towards web services.

The card image repository 150 can be any suitable memory device or devices have image data stored therein, images of fantasy playing cards. For example, the repository 150 may be the dataset 122 of FIG. 1 above.

Figure 3:
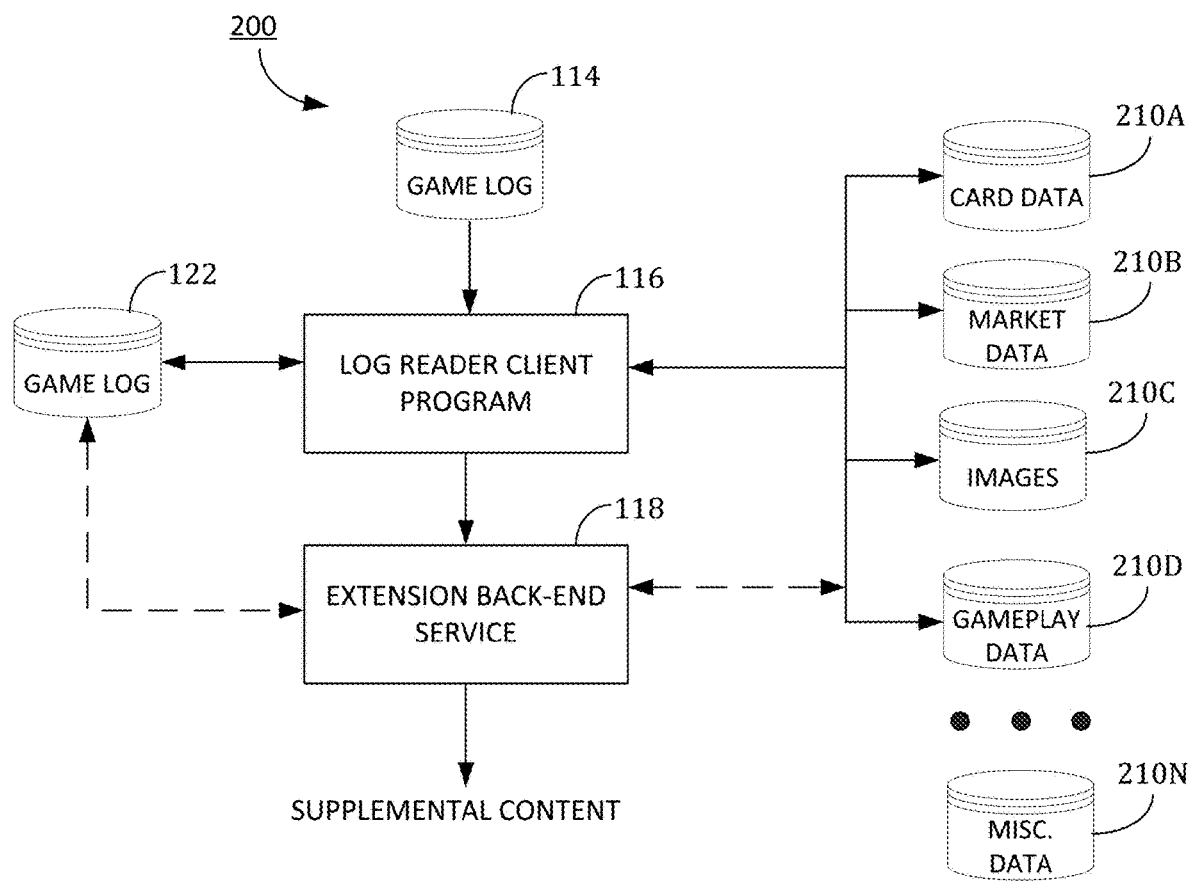
FIG. 3 illustrates a block diagram of one embodiment of processing operations for generating supplemental content.

Further within the system 140 are databases 160, 162 and 164. The stream extension backend 146 accesses the key-value store 160. In one embodiment, the store 160 is an in-memory database that persists on disk. The data it stores is a key-value format structure but much different kind of values are supported such as Strings, Lists, Sets, Sorted Sets, and Hashes. In one embodiment, the SQL database 162 may be an opensource database allowing for standard query logic data requests relating to electronic gaming card information. The database 164 may be a search engine database allowing for data search operations relating to the gaming card information.

Where the system 100 of FIG. 1 reads the game log, FIG. 3 illustrates one embodiment for generating the supplemental content. FIG. 3 illustrates general data interaction, where it is recognized these operations can be performed across one or more networked connections.

The system 200 of FIG. 3 includes the LRCP 116 receiving the gameplay data from the game log 114.

In one embodiment, the LRCP 116 reads the gameplay data from the game log to extract searchable information therefrom. For example, the gameplay data includes the name or other form of identifier for the cards active or being played within the game. In one embodiment, the gameplay data may include a field identifier indicating the card name. Upon recognition of the field identifier, the LRCP 116 then extracts the card name.

The LRCP 116 can therein access one or more databases having supplemental data therein. In one embodiment, the LRCP 116 accesses the prepared dataset 122. Further embodiments provide for accessing other databases(s). By way of example, the system 200 illustrates 5 exemplary databases, a card data database 210A, a marketplace data database 210B, an image database 210C, a gameplay data database 210D, and a miscellaneous data database 210N, where N represents any suitable integer. It is recognized that any number of databases 210 can be accessed. Moreover, the databases 210 can be local or network accessible, including public and/or proprietary information.

The LRCP 116 accesses these databases 210 to retrieve supplemental data associated with gaming cards being played, as indicated by the game log. Varying sources of data can be based on any number of different embodiments. For example, permissions or subscription services may include access to a proprietary image database 210. Another embodiment can be a viewer preference or setting for receiving particular types of information.

The LRCP 116 transmits the gameplay data and supplemental content to the EBS 118. In some embodiments, the supplemental content may have different formatting and the LRCP 116 or the EBS 118 may perform processing operations to modify the data for presentation. By way of example, card image data may have varying dimensions and all images may be resized to a determined pixel window setting. In another example, card data may be in a different language and requiring translation prior to display.

Figure 4:
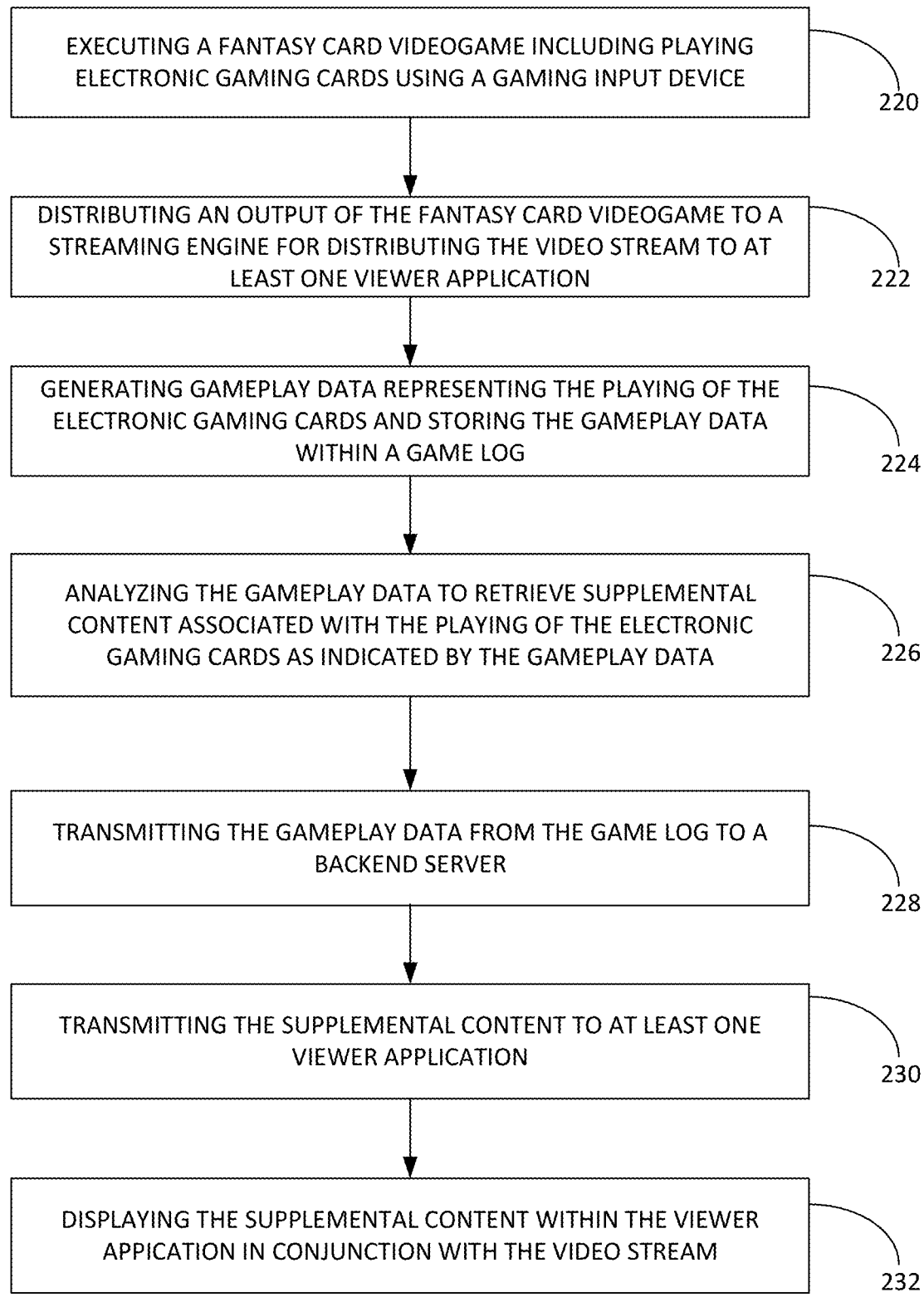
FIG. 4 illustrates a flowchart of steps of one embodiment of a method for supplementing a video stream.

The EBS 118 can therein access and retrieve data from the databases 210. The EBS 118 can perform processing operations for formatting or adjusting the supplemental content for the viewer application. In one embodiment, the supplemental content 118 sent from the EBS module 118 can be a raw data source with the viewer application filtering content. For example, the EBS module 118 may send all supplemental data available for a particular card, the viewer application having a setting to display only images and card data, but not market data.

Where FIG. 3 illustrates the LRCP 116 generating the supplemental content, it is recognized that processing operations may be disposed within or supplemented by the EBS 118. For example, the supplemental content retrieval operations can be performed by the EBS 118 using game log data determined by the LRCP 116. Therefore, FIG. 3 further includes the dashed-lines showing the alternative embodiment of connecting the EBS 118 to the servers 210 and prepared dataset 122

Where FIGS. 1-3 illustrate the processing environment and architecture, FIG. 4 is a flowchart of the steps of one embodiment of a method for supplementing a video stream of a fantasy card videogame.

Step 220 is executing a fantasy card videogame including playing electronic gaming cards using a gaming input device. As noted above, the videogame can be executed on a local processing device, with user interactions via a gaming controller or keyboard.

Step 222 is distributing an output of the fantasy card videogame to a streaming engine for distributing the video stream to at least one viewer application. In a typical embodiment, the streaming engine is network-based with a locally-executed application to process and distribute the game content to the streaming network. The viewer application is typically run by a third party looking to watch the livestream content across the network connection.

Step 224 is generating gameplay data representing the playing of the electronic gaming cards and storing the gameplay data within the game log. For example, gameplay data may include the name of a card (e.g. the name of the character shown on the card) being played. The gameplay data can also include playing sequence, such as if it is the first, second, third, etc. card being played.

Step 226 is analyzing the gameplay data to retrieve supplemental content associated with the playing of the electronic gaming cards as indicated by the gameplay data. In one embodiment, FIG. 3 illustrates this step.

Step 228 is transmitting the supplemental content to the backend server. Step 228 may be performed by the LRCP 116 of FIG. 1, the transmission being across the networked connection.

Step 230 is transmitting the supplemental content to at least one viewer application. In one embodiment, the supplemental content can be translated or otherwise modified for insertion into a presentable format for the viewer application. For example, for image data, images can be resized to fit a preset display window. In another example, for card data, information may be translated into a different language.

Step 232 is displaying the supplemental content within the viewer application within the viewer in conjunction with the video stream. The videogame itself is streamed via the streaming engine and the viewer application is run, in one embodiment, as an extension or plug-in to the locally-executed streaming player.

The viewer application receives the supplemental data and monitors user interfacing with the streaming application. When the user places a cursor near or over a card, or any other suitable interface operation to signify requesting supplemental content, the viewer application then displays the supplemental content.

Figure 5:
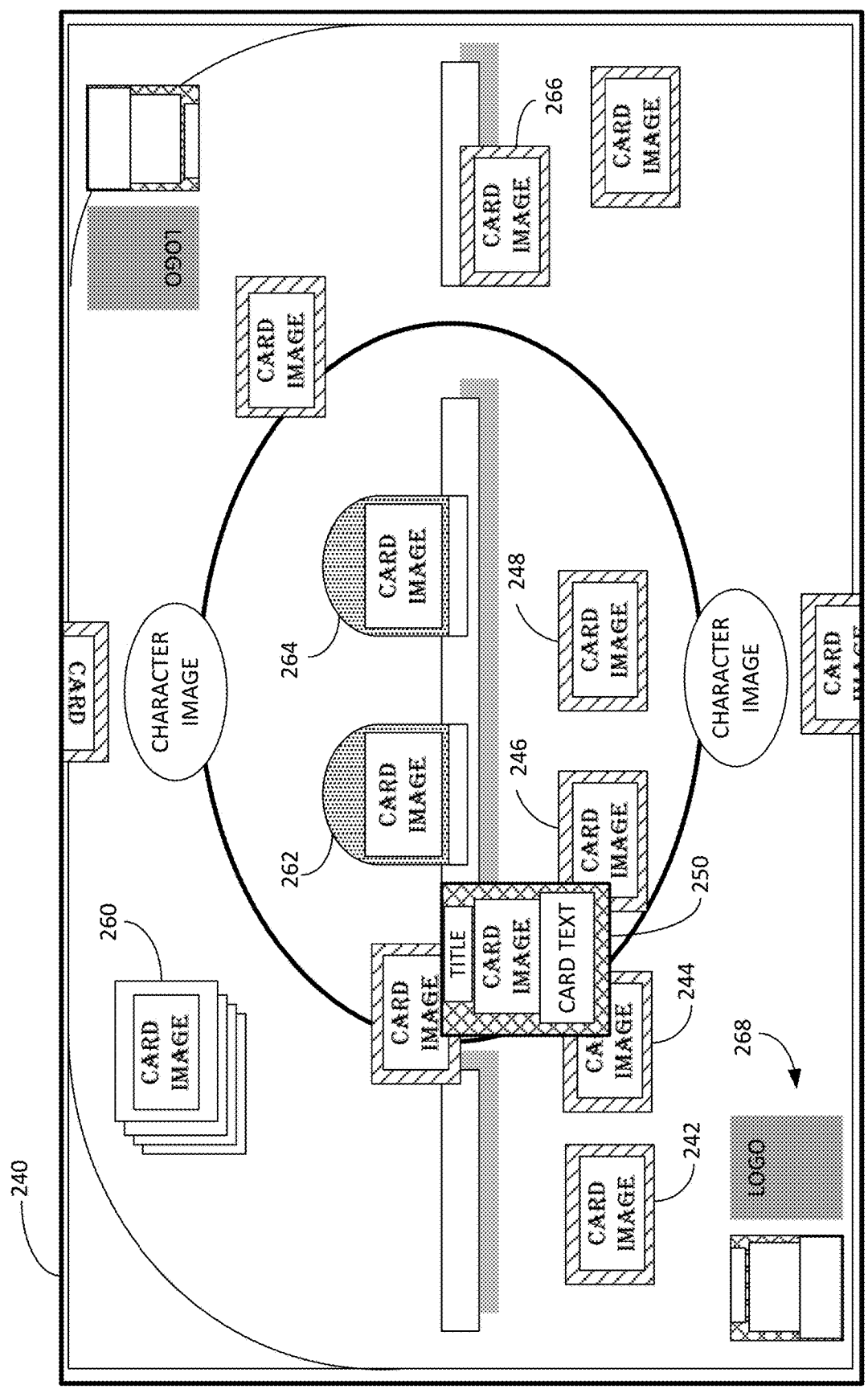
FIG. 5 illustrates a screenshot of a fantasy card videogame.

FIG. 5 illustrates a sample screenshot of a fantasy card videogame including a playing screen 240 with multiple fantasy cards. In this screenshot, four cards 242-248 are played with a fifth card 250 being played. The cards 242-250 include images, typically an image of the character or a feature of the card. The card being played 250 additionally includes a title field and card text.

Further visible, the playing screen 240 includes additional playing cards with images, such as cards 260, 262, 264, 266. The screen 240 further has a deck and a discard pile 268 for the player, among other features. The screenshot of FIG. 5 illustrates recognized gameplay playing the fantasy card videogame. This screenshot represents not only what the player sees in playing the game, but can also represent the streaming content visible to viewers.

Figure 6:
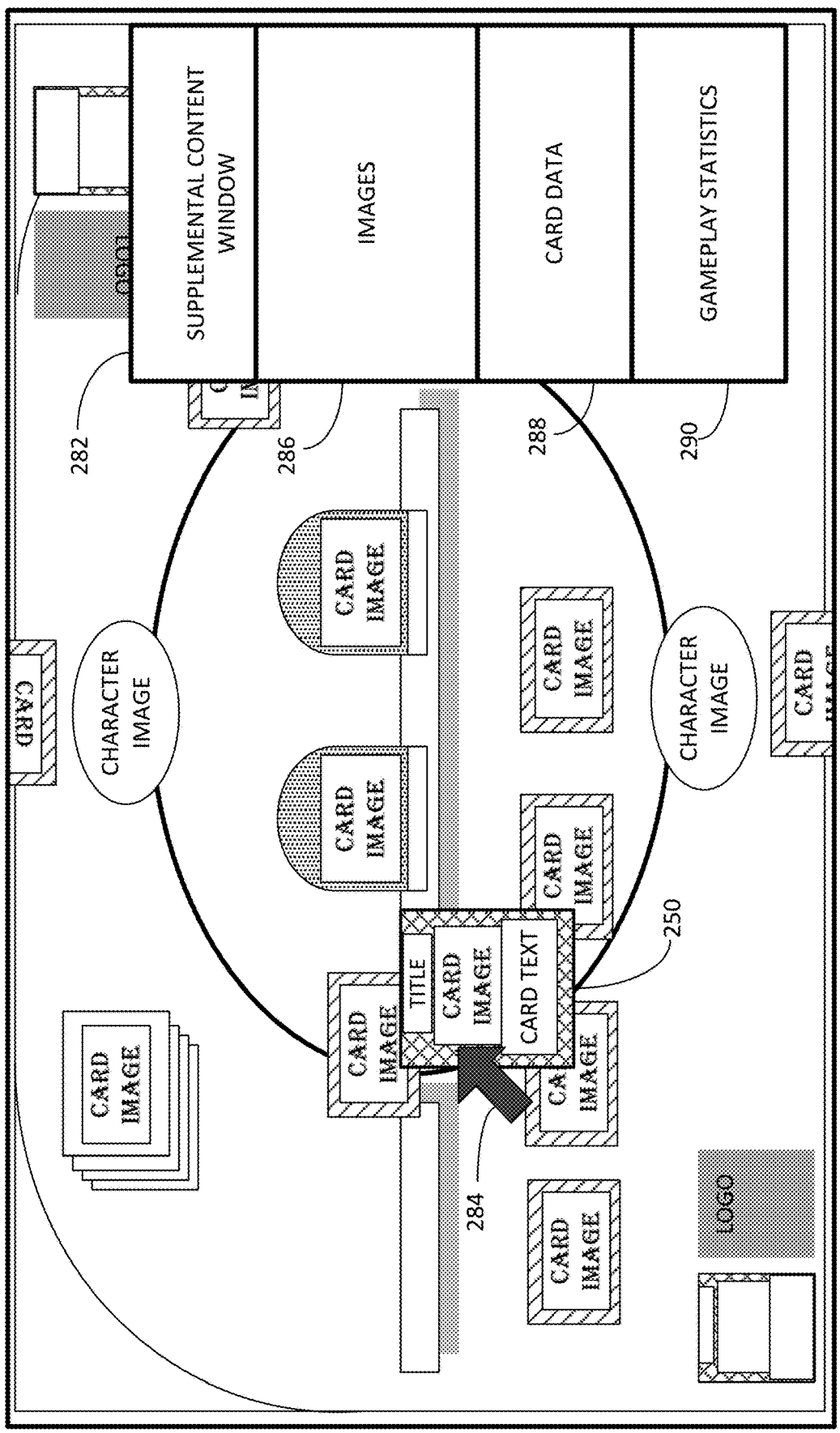
FIGS. 6-7 illustrate screenshots of a fantasy card videogame stream output with supplemental content.

Quickly recognizing and seeing the details of the electronic gaming cards is complicated by the limited real estate of the display screen 240. In the streaming viewer, FIG. 6 illustrates a screenshot of viewer application in response to viewer interactions. The screenshot 280 is similar to the screenshot 242 of FIG. 5, but includes the visual overlay 282 including supplemental content.

Based on tracking user interactions, the viewer application notes the placement of a cursor 284, or any other suitable positional marker, and displays the supplemental content associated therewith. In this case, a viewer can hover the cursor 284 near the card being played, causing the display of the supplemental content window 282.

In this example, the window 282 includes one or more images 286, a card data field 288, and gameplay statistics 290. For example, the images can be images of the card image not readily visible in the in-game display. The card data 288 can be the background story of the card, the powers, strengths and weakness of the character, and the statistics 290 can be data showing often this card is played and the strength or value of the current play.

In one embodiment, the determining of cards being played in on-screen locations is based on predetermined card-play locations or zones. In these videogames, the gaming board typically includes zones or areas for playing specific types of cards. Thus, detecting a viewer overlay and which supplemental information to display can be zone-based.

Similarly, based on available data from the game log, the game log may not include a specific playing sequence cards. Thus, the overlay application may not directly know which cards in specific zones are viewable and which are occluded. Therefore, one embodiment can include displaying all supplemental data from the zone and allowing the user to select or de-select supplemental content window(s) or section. Another embodiment can include gameplay intelligence to determine or estimate the sequence of card play based on known card plays, for example estimating play Card B after Card A based on the likely relation between Cards A and B.

In one embodiment, the viewer application maps the card images on the display screen using known scanning or image processing techniques. The cards images can be assigned x,y screen coordinates. When the cursor position is detected within this screen coordinates, the viewer application uses a look-up table or other reference to activate the supplemental content window 282, retrieve the appropriate fantasy card supplement content, and populate the data fields in the display.

In one exemplary embodiment, player 1 is playing and streaming a collectible trading card game. In this embodiment, player 1 has the LRCP installed and executing concurrent with the game. On a first turn, player 1 draws three cards: (1) water bucket; (2) sanctuary; and (3) bird sanctuary paradise. The LRCP reads the game log, which captures the state of player 1's hand including these three specific cards.

The LRCP broadcasts the card information to the EBS. In one embodiment, the EBS can therein access image data, market price data, and other information on the cards. This information is passed to the streaming application, via the extension. A pub/sub interface of the stream takes the information, renders it visually in the stream. Therein, viewers watching the stream of player 1 can see this supplemental card data.

The viewers, via the streaming app and extension, now see an overlay resting on top of player 1's streaming gameplay. The overlay display illustrates player 1's hand including: water bucket card plus image plus market price data; sanctuary card plus image plus market price data; and bird supreme paradise card plus image plus market price data.

In the game itself, player 1 can play the water bucket card on to the battlefield. The battlefield has a distinct zone for this card play. Player 1 now has water bucket card on the battlefield and sanctuary and bird supreme paradise cards in her hand. The LRCP reads the changes in game state (e.g. one card is now on the battlefield and not in player 1's hand. The process noted above repeats including the LRCP transmitting the updated information to the EBS and stream visual updates send to the extension application.

Back within game, player 1 can now pass. Opponent, player 2, has a hand of three cards, all unknown to player 1 and the stream viewers. Player 2 plays a card, Despicable Mage, on player 2's side of the battlefield.

Again, the LRCP recognizes the change in the game log and submits this information to the EBS. Based thereon, the visual stream is updated based on the gameplay as detected from the game log.

Figure 7:
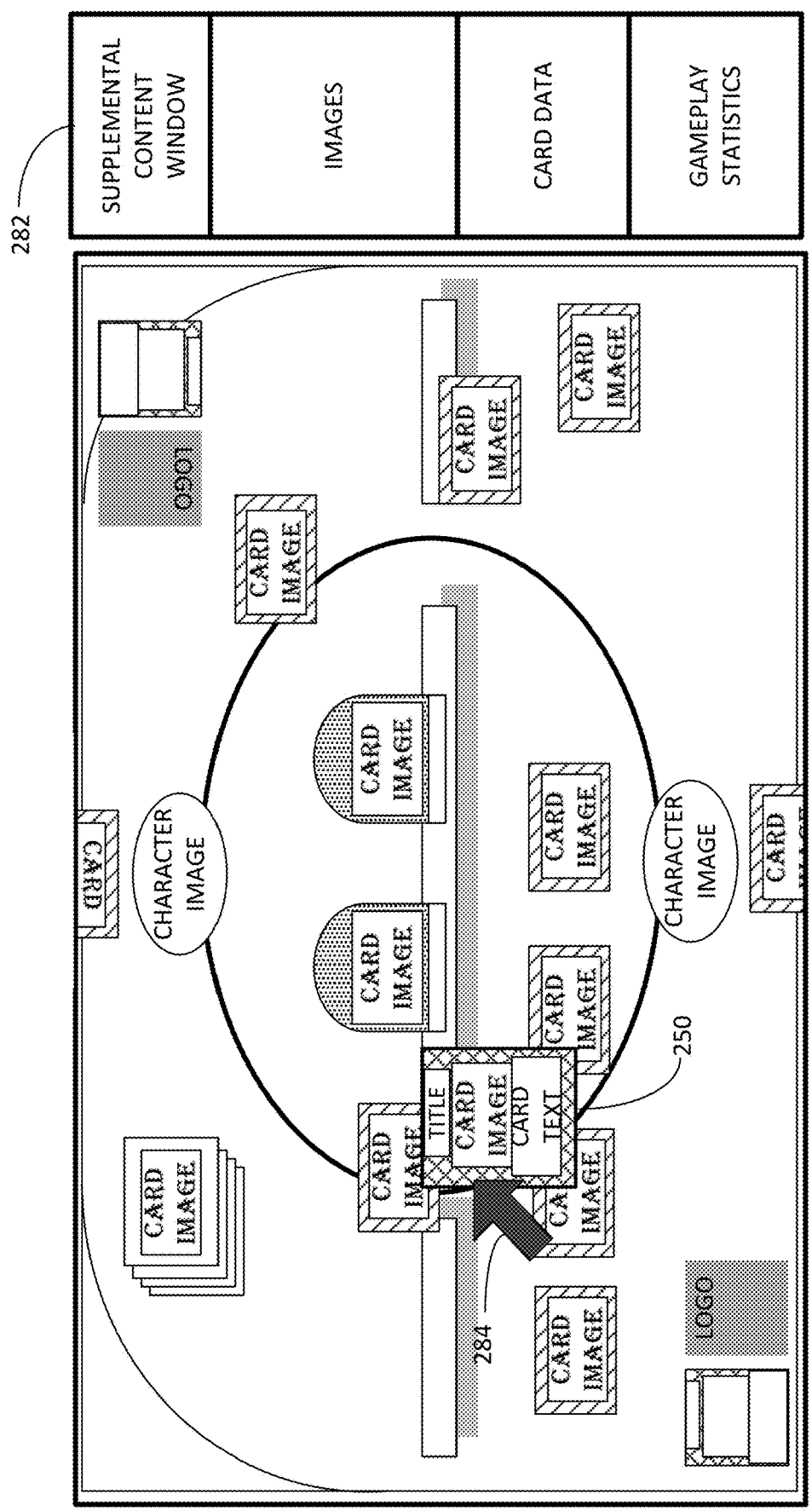

FIG. 7 illustrates another viewer display screen, here using a secondary window display. In this embodiment, the streaming display is in a first screen 300 and the supplemental content is in a second screen 302. Therefore, in this second screen, the content does not obscure any of the videogame streaming content. It is recognized that one embodiment may include these two screens 300 and 302 on the same output, but the supplemental content 302 can be directed to a second-screen environment, such as content displayed on a mobile phone and the streaming content viewed on a computer browser.

It is recognized that any number of viewing variations are within the scope of the invention herein. Varying embodiments can include differing windows, but can also include differing content within the windows. For example, one viewing window may include predictive analysis based on knowledge of the player's decklist and based on what is already known about the game, including cards drawn and played. For example, one embodiment may include artificial intelligence or gameplay heuristics to determine estimated likelihood (percentages) of gameplay sequences as well as player odds. Thus a display window may include not only card information, but gameplay information including a calculated percentage for the player to win the game.

Another example of viewing information can be marketplace data. Players collect different cards and accumulate decks, including by purchasing collections of cards and individual cards. It is recognized marketplaces exist for purchasing these electronic cards. For example, FIG. 3, market data 210B database includes market data and can include historical data. Therefore, viewing data may include market price information such as current price on various markets, price last week, 52-week price high and low, percentage change in price over period of time, etc.

Further viewing windows can include augmenting card image with alternative images, such as from public and/or proprietary databases. For example, alternative images may include images different from the actual card image within the game. Further viewing customizations can include stylized frames, alternative colors, larger text formatting for accessibility and readability, etc.

The viewing window can also be a horizontally oriented window, where FIGS. 6-7 illustrate vertically oriented windows. For example, the window can include a moving ticker showing market data for card during gameplay.

Figure 8:
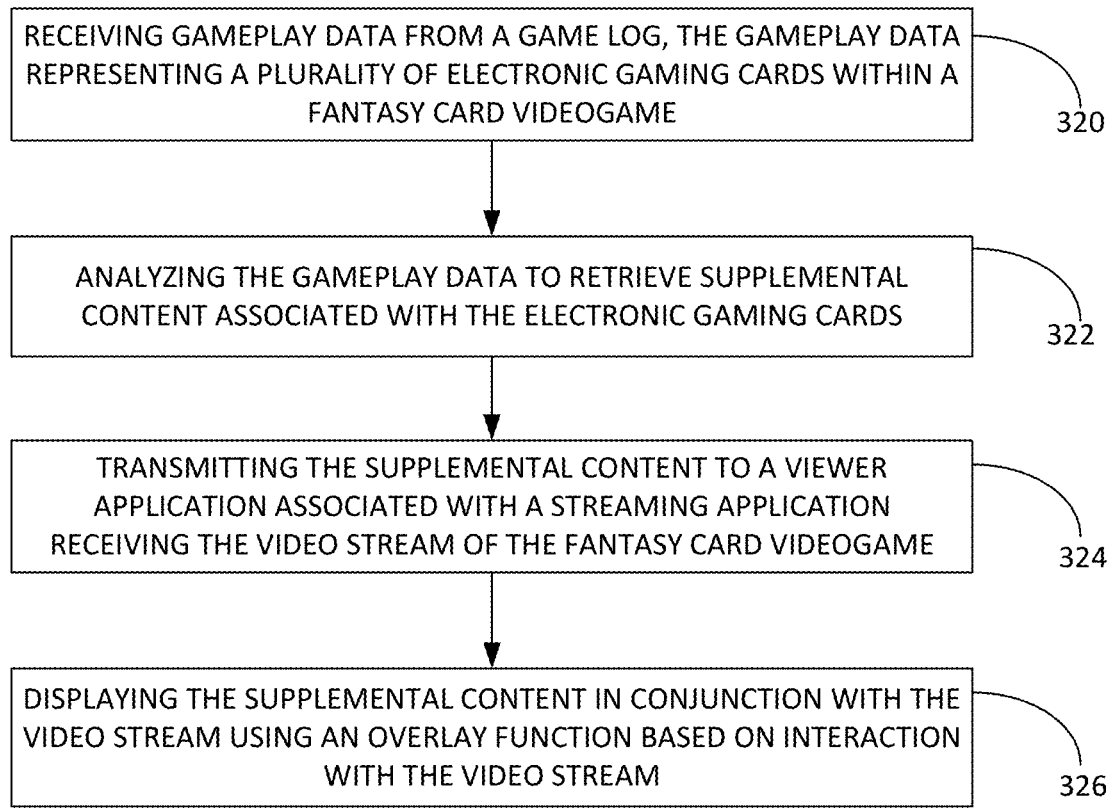
FIG. 8 illustrates a flowchart of the steps of one embodiment of a method for supplementing a video stream of a fantasy card videogame.

FIG. 8 illustrates steps of another embodiment of a method for supplementing a video stream of a fantasy card videogame. The above embodiments describe operation in a three processing system environment: the gaming device, the streaming server and backend processing system, and the viewer processing device. Other embodiments allow for different executable locations. For example, the gaming operations can be performed in a network or cloud-based environment with local or client-based execution being simply a user interface. In another example, the game log may be stored on the network and not client-based.

Step 320 is receiving gameplay data from a game log. The gameplay data is received from videogame execution, whether it be local or network-based execution.

Step 322 is analyzing the gameplay data to retrieve supplemental content associated with the electronic gaming cards. This analysis may be performed in either a network processing environment and can be locally-executed. In further embodiments, this step can be performed in different environments, such as one retrieval of supplemental information can be via a public content database and further retrieval is from a proprietary database.

As noted above, varying embodiments provide for different analysis and supplemental content. For example, the method and system having gameplay knowledge can engage in predictive analysis, estimating likelihood of card plays and player success. Without gameplay data, it would be statistically improbable to accurately predict the likelihood of any particular card play within a general gaming sequence and subsequent likelihood of a player's victory. The method and system having the gameplay data can then conduct predictive analysis based not on the universe of gamecards, but rather on the known subset of cards left in the player's deck. Therein, the processing system can perform statistical analysis on gameplay activities, including probability or estimations of specific card play using the known data set. The location and execution of these predictive operations can be performed within the processing environment, such as within the LRCP 116 or the EBS 118 of FIG. 1. In another embodiment, the predictive analysis may be performed on a third-party processing device or networked server having greater readily-available processing power.

Step 324 is transmitting the supplemental content to a viewer application associated with a streaming application and receiving the video stream of the fantasy card videogame. This transmitting step can be sent from a streaming server. In another embodiment, if the user generates and transmits the streaming content from a local device, the distribution can be generated directly from the user's computer.

Step 326 is displaying the supplemental content in conjunction with the video stream using an overlay function based on interaction with the video stream. In one embodiment, a viewer application is executed on the viewer device, such as a plug-in or extension to the streaming viewer. In another embodiment, viewer application can run on a server or network connection with a cursor position tracking application locally-executing on the viewer device.

In further embodiments, the game log may include additional information usable for improving the supplemental content and/or viewer application. For example, the game log may include card playing sequence information, usable for determining which card(s) are fully viewable on the electronic display.

In another embodiment, the game log may include a comprehensive list of a player's starting deck of cards. This starting deck information allows for a much more compact supplemental data or prepared dataset. For example, if each player has 50 cards, that means the dataset covers 100 cards instead of covering the thousands of cards. This can improve the data search and retrieval time components. Similarly, with smaller datasets, the supplemental data may be loaded at one or more different locations in the streaming and viewer application pipeline.

In one embodiment, the start deck list for a player can be determined from the game log listing the cards within the deck of the player. For example, one technique may include a user registering his or her deck with the game, that registration of a particular deck indicates a subset of cards that can be played within the game. During gameplay, the player pulls cards from the stack of cards and thus this pre-registered deck indicates the defined subset of available cards. In the example of a game having 1500 unique cards, the player can register a deck with 75 of those 1500 cards. Gameplay is one card as a time. Therefore, the processing described herein can be performed relative to the exemplary 75 cards of the registered deck instead of being relative to the full exemplary 1500 cards.

With multiple player games, one embodiment can include security protocols for limiting or prohibiting data sharing. For example, if player A registers his deck of cards, player B should be prohibited from acquiring access to knowledge of this deck. Otherwise, the player B can gain an unfair advantage knowing player A's cards. One exemplary technique for limiting or prohibiting data sharing can be to encapsulate or encrypt pre-registered deck information on a processor only local to the player or on a secured third-party server.

These fantasy card videogames are typically two-player games, against a computer or another player. In streaming content, the stream is initiated based on viewing one specific player's viewpoint. Therefore, where there are two players, it is conceivable to view the same game in two different streams. The system operates to process the game log data available from the player enabling the streaming function. In this embodiment, the game log, acting as the basis of the gameplay data, is generated by the streaming player's game execution.

With multiple players, one embodiment may include a network-based recognition of both players with shared access to the game logs. Access to this data improves supplemental data by having the prepared dataset more readily available. A central repository having knowledge of the game decks for both players can therefore better estimate and anticipate outcome likelihoods and contribute these data points for streaming viewers through the extension. For example, having knowledge of the decks allows estimating a percent likelihood of victory for a particular player based on remaining cards available not only in a player's deck but also with his or her hand.

Figure 9:
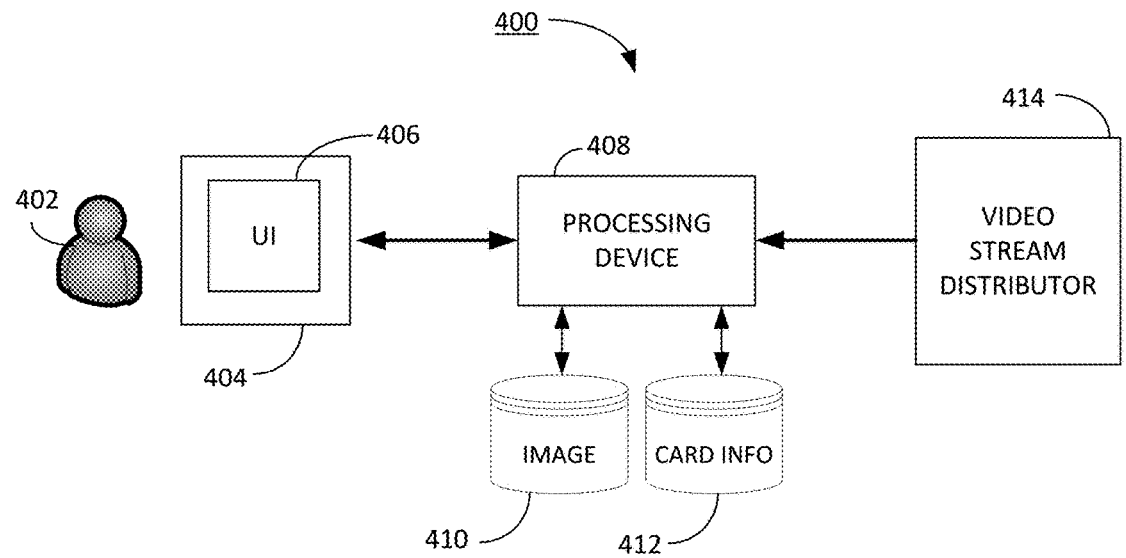
FIG. 9 illustrates a block diagram of a processing system for augmenting a video stream.

FIG. 9 illustrates a block diagram of a system 400 for augmenting a video stream, where the video stream is live or in-person gameplay. The system 400 is accessible by a user 402 having a computing device 404 with a user interface (UI) 406 thereon. The system includes a processing device 408 accessing an image database 410 and a card information database 412, as well as receiving input from a video stream distributor 414.

The user 402 may be any suitable user viewing or otherwise interacting with the UI 406 on the computing device 404. The computing device 404 may be any suitable processing device operative to execute the UI 406, engaging connectivity to the processing device 408 or any other intermediate server or system not expressly shown. By way of example, the computing device 404 can be a desktop or mobile computer, a set-top box, or a gaming console. In another example, the computing device 404 can be handheld device, such as a mobile or smart phone, a tablet computer, etc. The computing device 404 may be any suitable device or combination of devices allowing for the user 402 to receive content via the user interface 406 as described herein.

Communication between the processing device 408 and the device 404 can be across any suitable communication medium, such as wireless network, wi-fi connection, wired network connection, cable connection, etc.

The UI 406 may be any suitable application allowing for viewing a video stream. In one embodiment, the UI 406 can be a stand-alone dedicated viewer application receiving a wide variety of streaming content, for example the Twitch® UI 406, available from Amazon, Inc. The UI 406 may be a proprietary or dedicated viewer for subscriber content. The UI 406 may include additional functionality beyond static content viewing, allowing for interactivity, for example selecting hyperlinks or accessing externally-referenced content.

The processing device 408 may be one or more processing devices for performing processing operations as described herein. The processing device 408 can be a combination of processing devices centrally located or in a distributed environment. The processing devices 408 may be distributed across a wide area network, such as the Internet in a distributed or cloud-based computing environment, whereby the proximity of the processing device 408 to the video stream content generation is not expressly limited. Rather, as described in greater detail below, the processing device 408 performs processing operations on a received video stream and can receive the stream across a networked or any other suitable distribution network.

The databases 410 and 412 can be any suitable data storage location or locations having data stored therein. For example, the databases 410 and 412 can be unitary data storage units, or can be distributed storage across a plurality of networks, centrally located or distributed. The image database 410 includes image fingerprint data relating to values representing images of playing cards.

As used herein, game play cards can refer generally to physical cards, such as 4" by 6" playing cards. Whereas, the term cards can more generally refer to any playable gaming elements within a fantasy-based card game, such as a coin, an odd-shaped card, a token, a multi-sided die or dice, or any other suitable gaming element or artifact.

The card information database 412 stores any additional information relating to gameplay cards. By way of example, but not expressly limiting, card data can include commercial information of a marketplace where the card is for sale, card data can include background story about the card, card data can include play data about the card, e.g. frequency of card, uniqueness of play, etc. In another embodiment the totality of gameplay can be a factor for card data, such as expressing the value of a play or move relative to the prior cards having been played, or for example with knowledge of the players' decks.

The video stream distributor 414 is any suitable device or system generating a video stream. For example, in one embodiment this device 414 may be a broadcaster directly broadcasting live in-person gameplay. In another example, the device 414 may be a livestream distribution server allowing for users to access the server and livestream or otherwise view gameplay.

The computerized system 400 includes the processing device 408 performing processing operations in response to executable instructions stored in a computer readable medium (not expressly illustrated). The processing device 408 receives the video stream from the distributor 414. As described in greater detail below, the processing device 408 performs processing operations to detect a card within the video stream, including initially detecting an outline of the card and then performing image recognition operations.

The processing device 408 accesses the image database 410 for retrieving the identification of the card and therein uses this identification to retrieve card information from the database 412.

Figure 10:
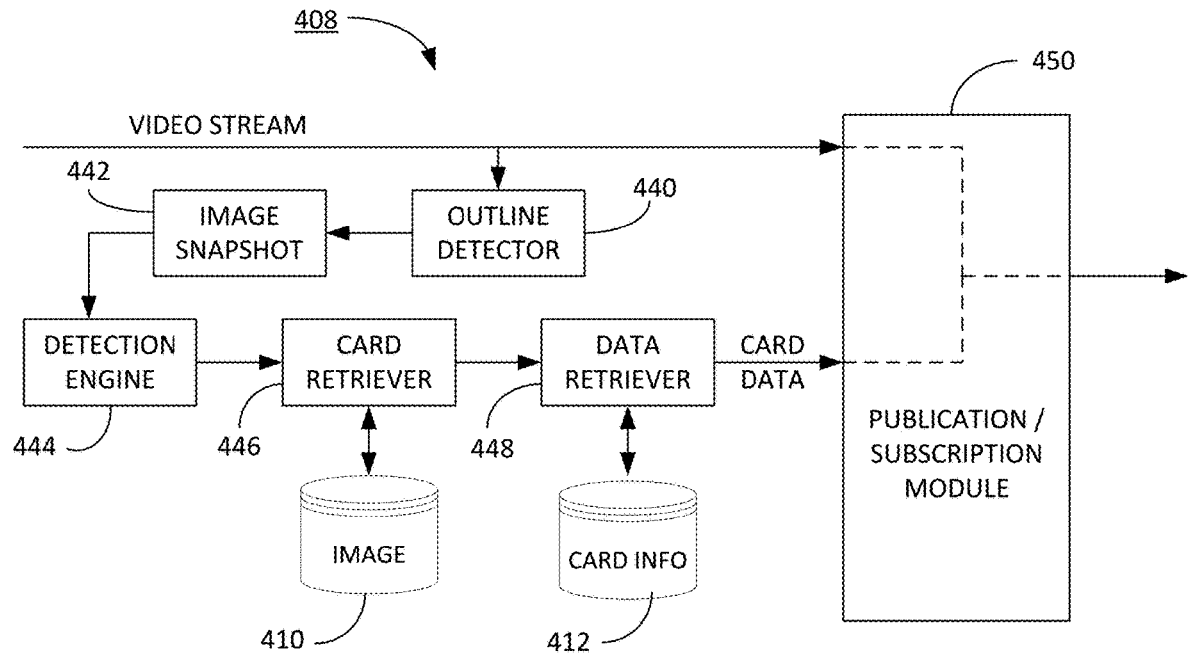
FIG. 10 illustrates a block diagram of one embodiment of the processing device providing for augmenting a video stream.

The processing device 408 distributes the card information to the user 402 viewable on the UI 406. The system 400 augments the video stream of players playing a card-based fantasy game without disrupting the video stream distribution.

Where FIG. 9 is a general system overview, FIG. 10 illustrates the processing device 408 in greater detail. It is recognized that to one skilled in the art, numerous processing elements are omitted for clarity purposes only, such as for example data input reception devices, security and other user registration modules, etc.

As illustrated in FIG. 10, the processing device 408 includes a plurality of processing modules, including an outline detector module 440, an image snapshot engine 442, a detection engine 444, a card retriever 446, a data retriever 448, and a publication/subscription module 450. These modules may be stand-alone processing modules or may be disposed within more general processing routines for performing processing operations as described herein.

The processing device 408 receives the video stream, such as from the distribution device 414 of FIG. 9. As the video stream proceeds in a sequence of continuous images, the outline detector 442 analyzes the video stream to detect a card outline.

Figure 11:
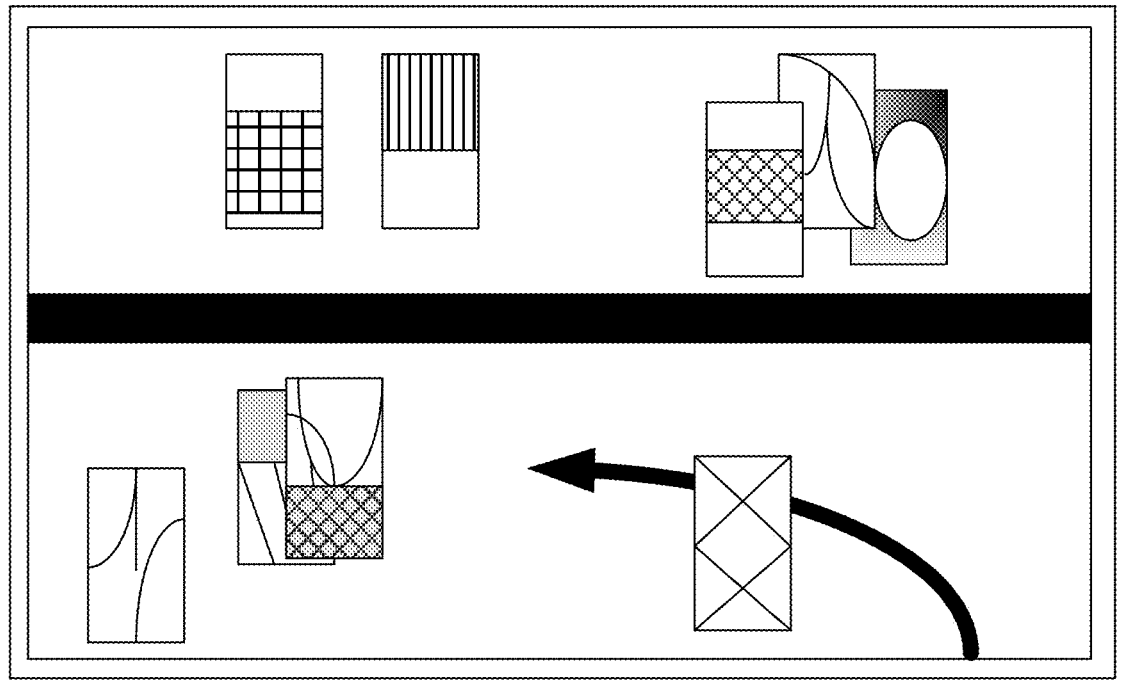
FIG. 11 illustrates a sample screenshot from a video stream having fantasy-based card game gameplay.

By way of example, FIG. 11 illustrates a sample screenshot of one segment of a card game with multiple cards, here the card with four Xs is being played. For clarity purposes, the hand of the player laying the card on the table is not illustrated). The play of the card is represented by the arcing arrow representing the movement of the card, the arrow not visible within the livestream.

Figure 12:
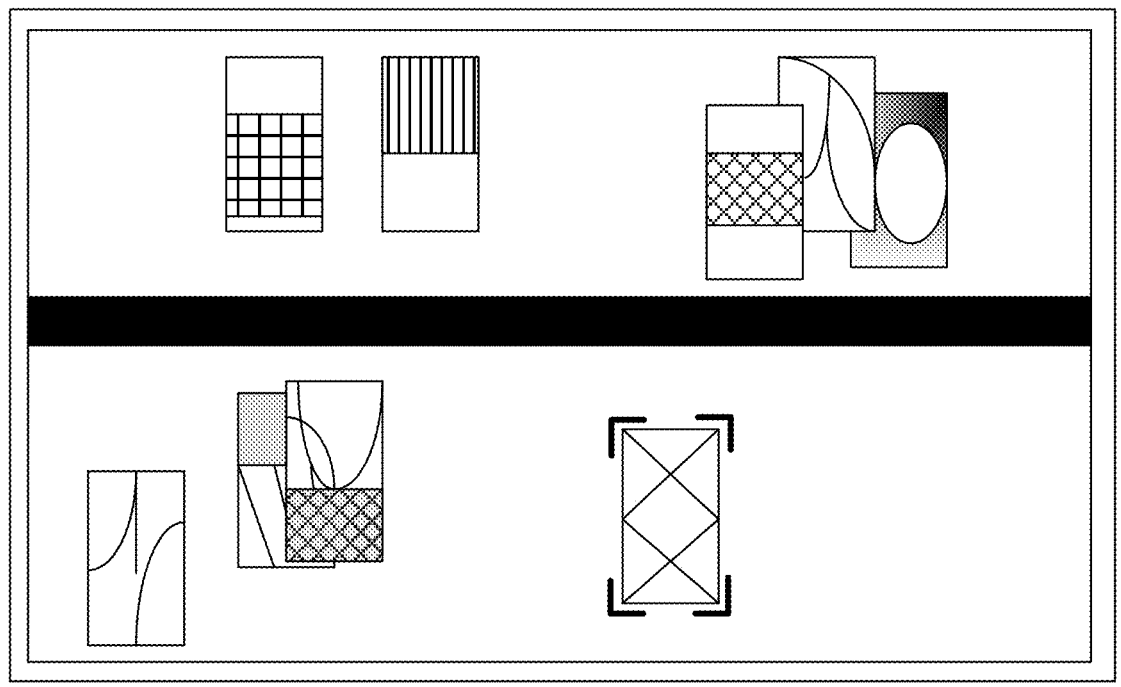
FIG. 12 illustrates one embodiment of edge detection on the video stream of FIG. 11.

Using the outline detector, FIG. 12 illustrates a visual representation detecting edges of the card. Here, the card is detected by having 4 distinct corners. Further discussion of the operations of the outline detector is noted with respect to FIG. 14 below.

Upon outline detection, the image snapshot module 442 creates a snapshot from the video feed. The snapshot is a single frame of the video feed allowing for additional image processing thereon.

Using the snapshot, the detection engine 444 performs image recognition operations on the card. For example, one embodiment may include using a hashing algorithm to convert the visual image into an image fingerprint, such as using any suitable well-known image to perceptual hashing technique.

Herein, the video stream displays fantasy-based card game gameplay, where these cards have ornate designs, sometimes with minimal variations between different cards. For example, all cards for a particular set may have the same general aesthetics, with common background designs, with variations as to card types, e.g. offensive, defensive, etc., and differences with names, words, and images. The commonalities of these cards complicates performing image recognition on a video frame snapshot. Thus, one embodiment includes the hashing algorithm using a cryptographic hashing technique allowing for higher accuracy in generating the image fingerprint.

Having this image fingerprint, the card retriever 446 access the database 410 to retrieve the name of the card. For example, the image fingerprint can identify the card as "Anaba Shaman" from Magic The Gathering®. Having this card name, the data retriever 448 then accesses database 412 to retrieve card information. The card information can be any suitable information relating to the card. Using the example of "Anaba Shaman," the card data can include background or related information on the card. In another example, the card data may include a link to a commercial marketplace where the card is being offered for sale. In another example, the card data can relate to the gameplay relative to the totality of gameplay based on tracking current gameplay activities, including when the card is played within the game or into which zone or segment of the board the gameplay occurs.

The pub/sub module 450 receives the card data from the retriever 448, as well as the video stream. The module 450 then distributes the card data to a viewing device (not shown) concurrent with the video stream. In one embodiment, the processing device 108 does not buffer or otherwise slow down the video stream to perform the image recognition. Therefore, any delay between the activity within the video stream and augmentation with the card data is due to processing time for performing the operations of modules 440-448.

Various embodiments allow for improving the accuracy and timing of the module 440-448 operations. For example, in gameplay, each player begins the game with a defined deck of cards. Therefore, the image database 410 can be pre-populated with just images for cards within the decks. For example, a complete deck may include upwards of 20,000+ cards, all with different images. Thus, if two players each have 20 cards, the database search is not reduced to search relative to 40 entries instead of 20,000.

In another embodiment, the system may include machine learning to improve image recognition techniques. Using a preset knowledge set, e.g. each player's decks, the system may apply machine learning iterative knowledge for improve image recognition operations. For example, one embodiment with machine learning may include applying known machine learning techniques to improve recognition accuracy, including using user feedback or automated feedback. User feed may include manual oversight of card recognition. By contrast, automated feedback may include utilizing pre-existing knowledge of player decks, such as performing a recognition operation and then comparing those results to the known decks for the player, such that recognizing the card being within the deck indicates a correct recognition. Machine learning operations, consistent with known machine learning techniques, can improve card recognition through iterative training operations.

Having preexisting card information can also assist in minimize time for collecting card data. For example, using the above example of knowing of 40 potential cards for a game, the card information database 412 can pre-populate with commercial marketplace information, e.g. links to online sales or auctions, for these cards instead of conducting any searching for this information while the card is being played in the video feed.

In another example, the card information may include source identifying information relative to the image recognition techniques herein. For example, if the card data is a hyperlink to a commercial website for purchasing the card, pub/sub module 450 or the card information in the database 412 can include referral identifier information indicating the sales lead was originated due to the image recognition operations. One example would be adding reference terms to the tail of a URL or utilizing an intermediate URL such as a truncated URL technique.

Figure 13:
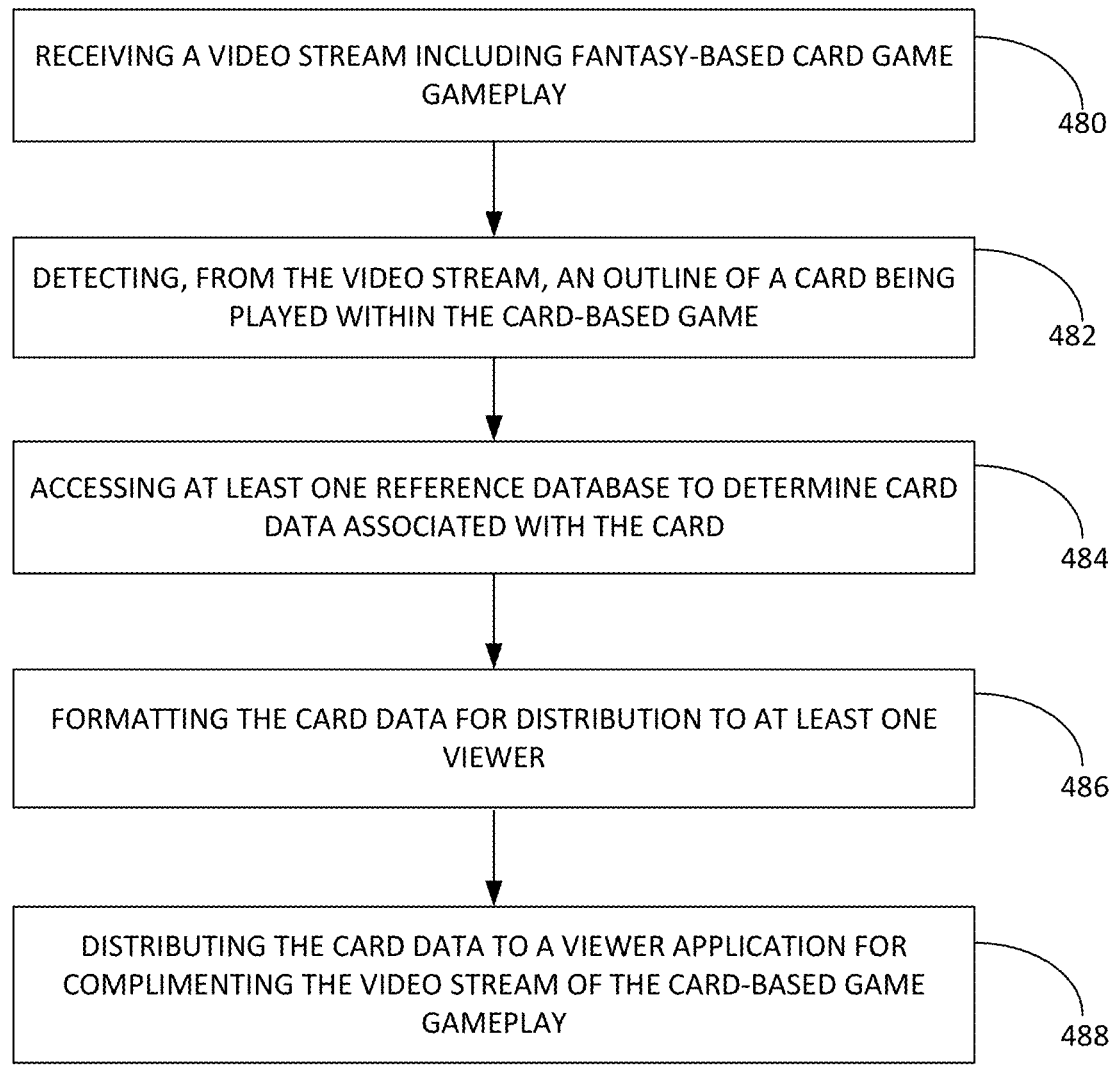
FIG. 13 illustrates a flowchart of the steps of one embodiment of a method for augmenting a video stream.

FIG. 13 illustrates a flowchart of the steps of one embodiment of a computerized method for augmenting a video stream. The steps may be performed, in one embodiment, using the processor 408 of FIG. 10. A first step, step 480, is receiving a video stream including fantasy-based card game gameplay. This video stream can be from any suitable source, including live recording of current gameplay, livestreaming of previously gameplay, etc.

Step 482 is detecting, from the video stream, an outline of a card being played, such as performed using, from FIG. 10, outline detector 440, snapshot engine 442, and detection engine 444, and card retriever 446 with an image fingerprint. Step 484 is accessing at least one reference database to determine card data associated with the card, such as using the retriever 484 and the card information database 412 of FIG. 10.

Step 486 is formatting the card data for distribution to at least one viewer, such as may be performed by the pub/sub module 450 of FIG. 10. Whereby, step 488 is distributing the card data to a viewer application for complimenting the video stream of the card-based game gameplay.

In one embodiment, the video stream is received from an external video stream source. For example, the source may be a livestream site or may be a broadcaster. In one embodiment, the video stream may be internal to the image recognition, such as being executed within the same content generation and distribution system.

In one embodiment, the distribution of card data may be to a single viewer or viewing source, such as single UI having a first window for the livestream and a second window the card data. In another embodiment, the distribution of the livestream may be a first viewer and the card data may be to a second viewer, such as being commonly executed, e.g. on the same computer, as the first viewer, or a completely different device, e.g. a second screen.

Figure 14:
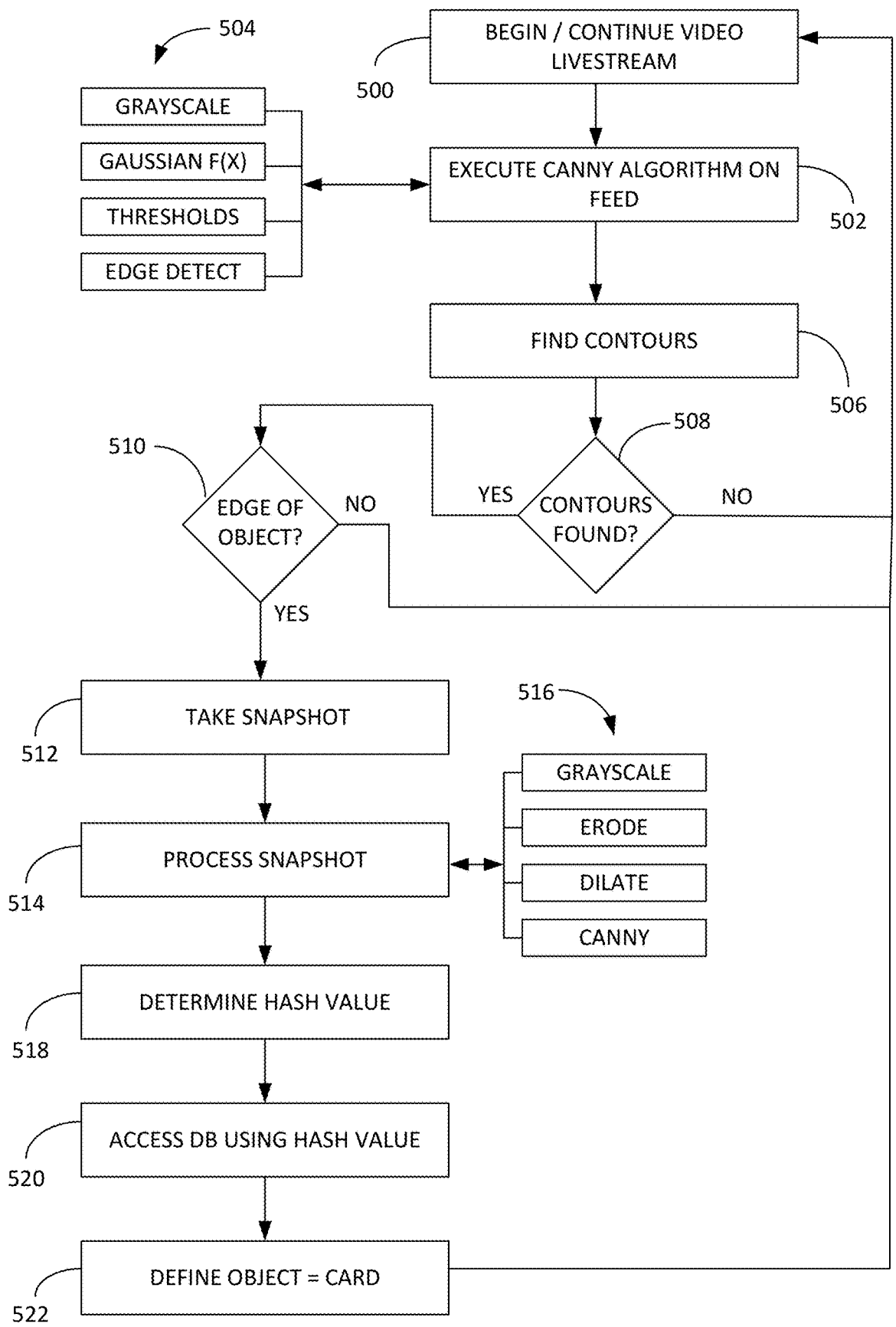
FIG. 14 illustrates a flowchart of the steps of one embodiment of an algorithm for augmenting a video stream.

FIG. 14 illustrates a flowchart of a further embodiment of the card detection operations. The flowchart illustrates the iterative nature of the processing technique for active gameplay that includes continuous sequential gameplay.

Step 500 is to begin or continue the video streaming. As the livestream is fed through a viewing application, video processing techniques seek to improve detecting the card. Live video streaming includes any number of card detection and recognition complications.

One complication is that different camera angles for live video cause cards to be viewed at odd angles. Where FIG.

11 screenshot shows an overhead view and the rectangular nature of the card is readily identifiable, the processing operations account for side views. In a side view, the rectangular shape of the card is now trapezoidal.

Another complication is the complexity of the images on the cards. As noted above, a deck may have upwards of 20,000 cards with common aesthetics. With any degradation in video quality, many of these cards may look similar, if not identical. Image capturing angles, such as the card being trapezoidal in shape, only further compounds image recognition difficulties.

Another complication is the continuous nature of image recognition and the continuous video feed. By not including a delay in the video feed, the image recognition occurs within a real time of the card play.

Therefore, the present method and system includes utilizing one or more image processing techniques. Step 502 is executing a canny algorithm on the video feed. The Canny algorithm is a known video processing technique for improving edge detection within an image, including processing modules 504, such as grayscale, gaussian functions, upper and lower threshold definitions, and object edge detection operations.

Step 506 is finding contours within the video feed. The contours are image processing markers indicating edges of an elements within the feed. The contours 506 are general to cards or relative to card game specifics. Therefore, inquiry step 508 is whether the contours are found. Finding contours is based on image processing techniques continually scanning the images of the video feed.

If the contours are not found in step 508, the method reverts back to step 500 to continue monitoring the video stream. If the contours are found, the method proceeds to step 510 for determining if the contour may be the edge of the object. For example, a typical game card is 4 inches by 6 inches, thereby based on a scale factor, the processing operations can include determining if the element is likely to be sized 4 inches by 6 inches. In further processing techniques, the processing engine may account for off-center or side camera angles, thus further sizing operations can account for offset camera angles, for example the card being trapezoidal shaped. Similarly, for non-card based images, the determination of edges can be predicated on the predicted shape of the object, such as a coin have a circular or oblong shape, a multi-sided die having an orthogonal shape, etc.

Step 510 is an inquiry step. If the contours do not determine or estimate an edge of the object, the method reverts back to step 500. In the above embodiment of processing the video feed, the contour and dimensions of the edges determined using the Canny algorithm. If the edge is found, step 512 is a acquiring a snapshot of the video feed. For example, this snapshot may be extracting a single frame from the video feed, allowing for further processing to be performed on this snapshot.

Step 514 is processing the snapshot for image recognition. Varying image processing modules 516 can be utilized to improve the accuracy and reliability of the image recognition operations. For example, grayscaling operations can eliminate complications due to coloring variances. In another example, erode operations can soften edges and dilate operations can expand the image. Similarly, one embodiment may include Canny image processing techniques.

In processing the snapshot, step 518 is determining the hash value, e.g. the image fingerprint. One embodiment includes using cryptographic hashing algorithms for improved accuracy. Step 520 is accessing a database using the hash value and step 522 is defining the object as the specific card identified from the database access. Therein, the method of FIG. 14 reverts to step 500 for continue processing, as after this card play, another player will be playing another card and the method seeks to recognize that next card.

Figure 15:
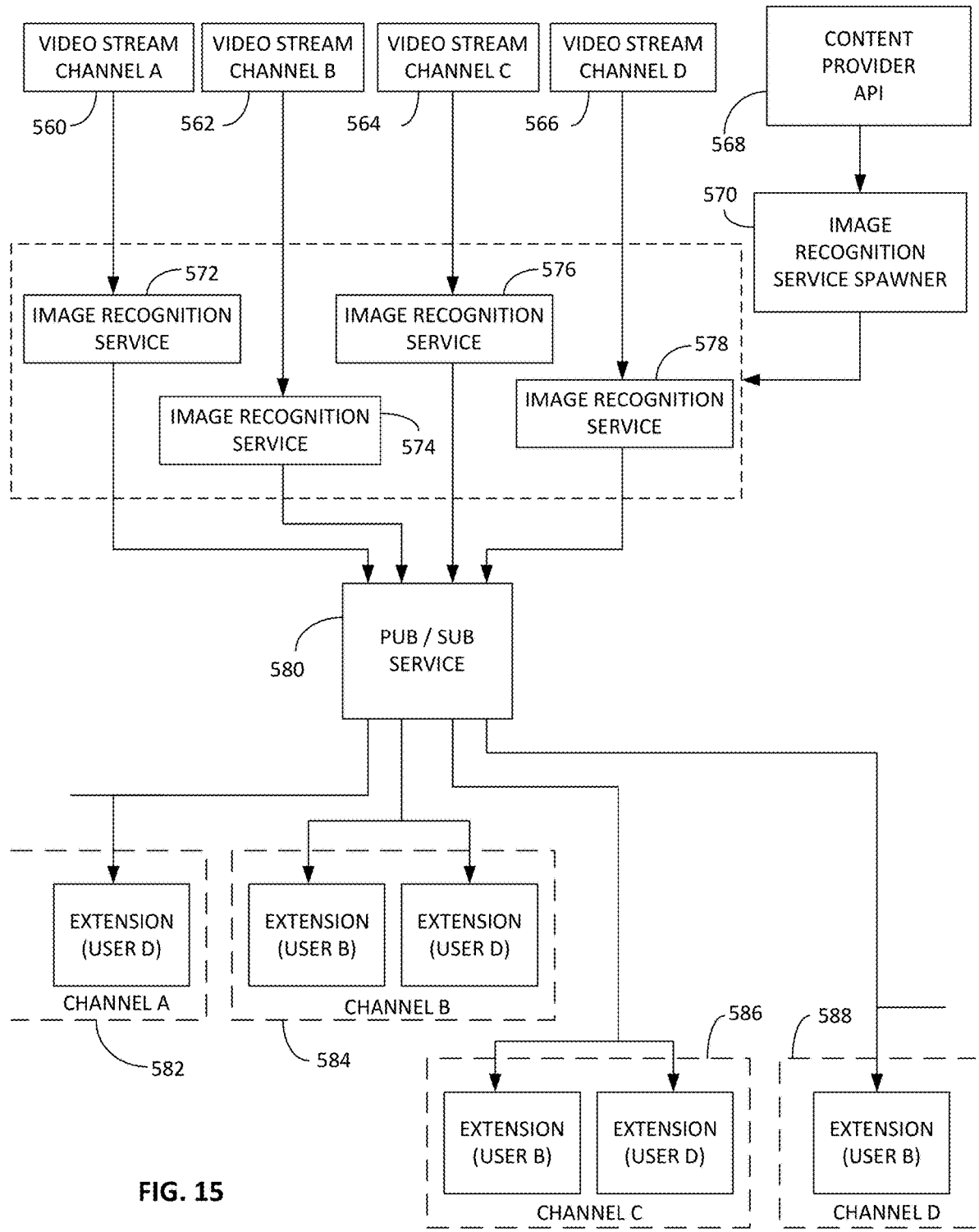
FIG. 15 illustrates a multi-user subscription service including processing for augmenting video streams.

The above system and method is described relative to a single video feed with a single viewer, but the method and system equally applies to any number of feeds and any number of viewers. FIG. 15 illustrates one embodiment for augmenting video streams. The system includes a plurality of video stream channels, channel A 560, channel B 562, channel C 564, and channel D 566. These streams can be unique streams originating from different sources. Or in another example, e.g. if a large tournament is occurring, the feeds may be individual matches within the tournament.

The video streams are viewable using any suitable type of browser or viewing application. A common example of current video stream viewing is via a Twitch® browser or any other commercially-available browser or application. The content provider, the source of the video channels, includes an API 268 indicating the various streams.

In the present method and system, an image recognition service (IRS) spawner module 570 becomes aware of the active channels 560-568. In one embodiment, an IRS is spawned for each channel. Therefore, in this example IRS 572 is spawned for channel A 560, IRS 574 for channel B 562, IRS 576 for channel C 564, and IRS 578 for channel D 566. Each IRS may perform operations as noted within processor 408 of FIG. 10.

For each channel, 560-566, each IRS then processes the stream to detect cards being played. Not expressly illustrated, each IRS may access a common data repository, e.g. databases 410 and 412 of FIG. 10, may have their own database(s), or a combination of dedicated and shared memory.

The pub/sub service module 580, in this embodiment, acts as a gateway for content distribution. Where there are multiple channels, there are multiple subscribers viewing one or more channels. Therefore, the pub/sub service module 580 distributes channel A content 582, channel B content 584, channel C content 586, and channel D content 588.

Channel subscription and access may be performed using known techniques for taking multiple incoming feeds and distributing these feeds to different users based on subscription or access request. The pub/sub service module 580 improves content distribution by augmenting the distribution of the video stream to additional include the card data acquired from each of the IRS 572-578.

In one embodiment, the pub/sub service module operates as the heart and soul of the system by including card data. As the IRS determines the card being played, the pub/sub service module 580 accesses card data for augmenting the video feed. This may include informational data, commercial data, gameplay data, etc.

In one embodiment, the module 580 may include additional processing techniques for card data. For example, one embodiment may include keeping a list of cards being played relative to a pre-existing deck list (e.g. counting cards) and providing a play estimate for forthcoming play options by different players. In another example, by tracking previous gameplays, one technique may include determining a significance value for a card play. For example, a significant value can include a likelihood of winning based on the particular play, or the strength of a player's hand, etc.

The module 580, with additional processing parameters, can thereby augment the gameplay by including dynamic gameplay-related information. Otherwise, the card data can be static data, such more information about the card, where the card is available for purchase, etc.

Figure 16:
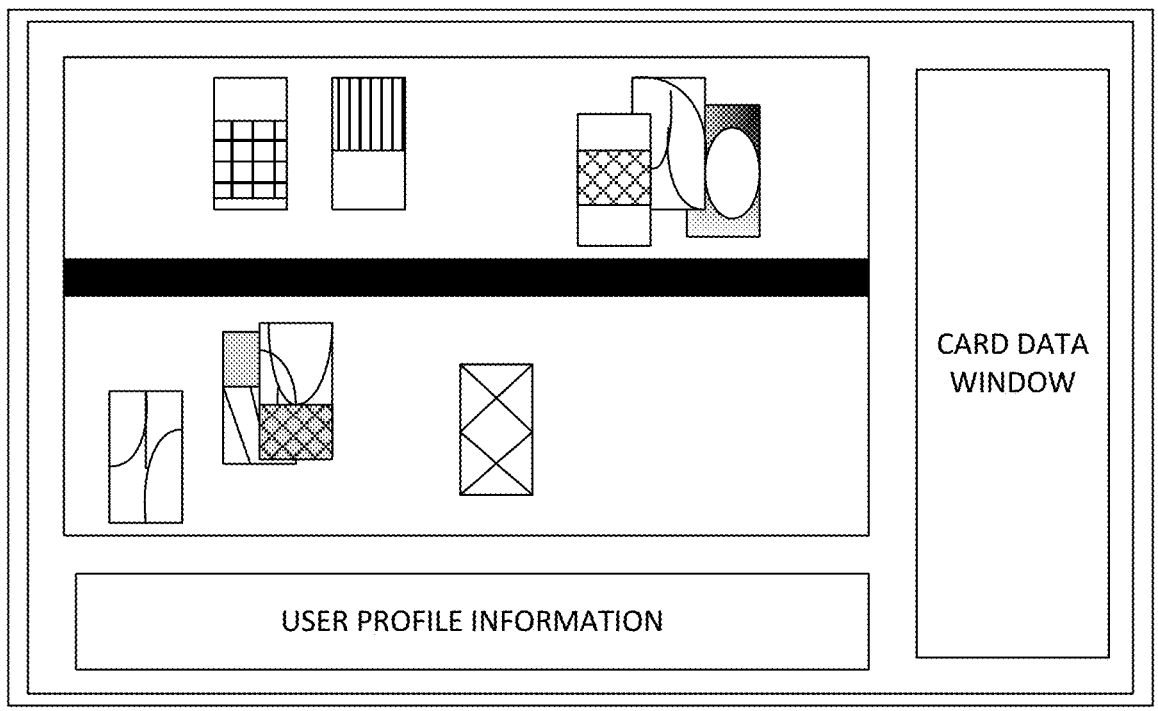
FIGS. 16 and 17 illustrate a sample screenshots of a viewer.

FIG. 16 illustrates one example of a viewer showing gameplay and card data. In this example, the viewer includes gameplay in a main window with card data window to the side. In this example, a bottom window may include user profile information. Here, the card data window can include interactivity, such as if the card data includes an active hyperlink, a user can select the link and view additional information or be directed to another site.

Figure 17:
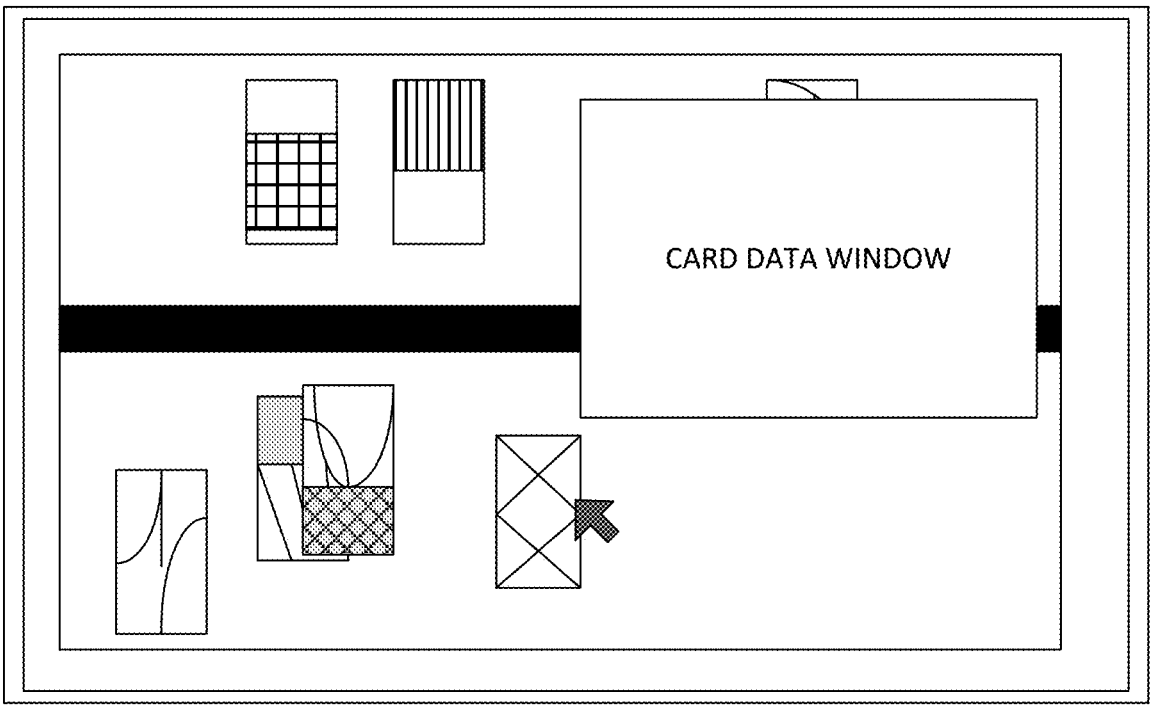

FIG. 17 illustrates another example of a viewer with gameplay and card data. In this example, card data may be visible in a screen overlay. For example, the overlay screen may be activated by holding a cursor over the newly played card.

Similarly, the card data is not expressly limited to an actively played card. For example, the card data can be a scroll screen having the previous card data readily accessible. In the example of overlay, an overlay screen activation, e.g. mouse-over for example, can apply to all cards having card data. In this example, a viewer can see all the currently-played cards and access card data for any card in an overlay.

In one embodiment, where the image processing is a continuous scan, image recognition can include recognizing all cards or gaming elements on a board and providing not just new card information, but also the previously-provided card information. In the example of a cursor overlay, placing a cursor or mouse over any card or game piece can then enable a pop-up window or other display formatting showing corresponding card data.

In addition to the recognition of a card or playing element, one embodiment further includes noting the sequence, timing, or location of gameplay. For example, a card played in an early move or a first game board zone may have a different meaning or value from being played later in the game or in a different zone. Therefore, one embodiment includes not only recognizing the cards being played, but also the sequence of gameplays, which can be included as part of card information. For example in this embodiment of a data field noting the sequence of gameplay can represent or provide for prior gameplay events, e.g. player two played "card X" in response to player one playing "card y."

Additionally, the above embodiments provide for image recognition with disruption of the video feed. Further embodiments may include video feed disruption in a non-live or a non-time sensitive environment. For example, if a tournament occurs in Asia and the video broadcast is to be viewed in Europe or the US, the video feed can be delayed. Therefore, additional embodiments may account for pausing or delaying the video feed for image recognition techniques described herein, such as for example pausing the video feed when a snapshot is taken and resuming the feed once the snapshot is processed. In another example, the interruption of the video feed can include feedback or machine learning iterations for improving recognition accuracy. Whereby, the present method and system is not expressly limited to operating in a real-time environment but can also perform content recognition for augmenting a video stream in a post-processing or a delayed environment.

In a further embodiment, the method and system further enhances the user experience by facilitating a purchase of cards or related collectibles. The method and system supplements the video stream of the fantasy card game to include information allowing a viewer to see and purchase an item via the user interface.

A fantasy game card is available for purchase. Pricing of these cards are often controlled by market conditions, so the present method and system may additionally access one or more pricing resources for determining an offer price. Physical versions of fantasy cards can also include a quality rating, so further information may be processed to verify the quality rating of the card itself and the price adjustments for the specific rating.

Additionally, the present method and system allows for any number of different entities providing cards available for purchase. For example, one seller may be an existing marketplace that provides for commercial transactions outside of streaming content. Another example may be one or more entities pairing up with a marketplace. Here, the marketplace or the seller can make their catalog of cards available for purchase.

Similarly, commercial transactions may be outside of an existing marketplace, such as streamers, players, or other entities offering their inventory for sale. In these embodiments, an existing marketplace may be used for finalizing the commercial aspect of the transaction or the platform that generates the card offer data can facilitate the transaction.

As used herein, gameplay cards relate to physical or virtual cards being actively played in the fantasy card game. An item for purchase is referred to as a collectible card, which may be used in gameplay at a later point in time, kept as part of a collection, or both. Cards for purchase can be individual cards or sealed cards, such as found in sealed packaging of a collection of cards. In addition, the collectible card can also refer to one or more game memorabilia items, such as character figurines, apparel, swords or other physical items. Examples may also be virtual objects associated with the fantasy game, such as in-game content, collectible virtual characters, virtual gaming items. Therefore, the offer for sale can relate to cards as well as other collectibles relating to the fantasy card game.

As described above, there are two primary modes of fantasy card video streams. The first mode is a videogame, with two or more players competing using electronic videogame applications across a shared gaming platform. The second mode is a live or in-person game between two players with a live feed of the active game or a video replay. The present method and system operates with both types of systems.

Figure 18:
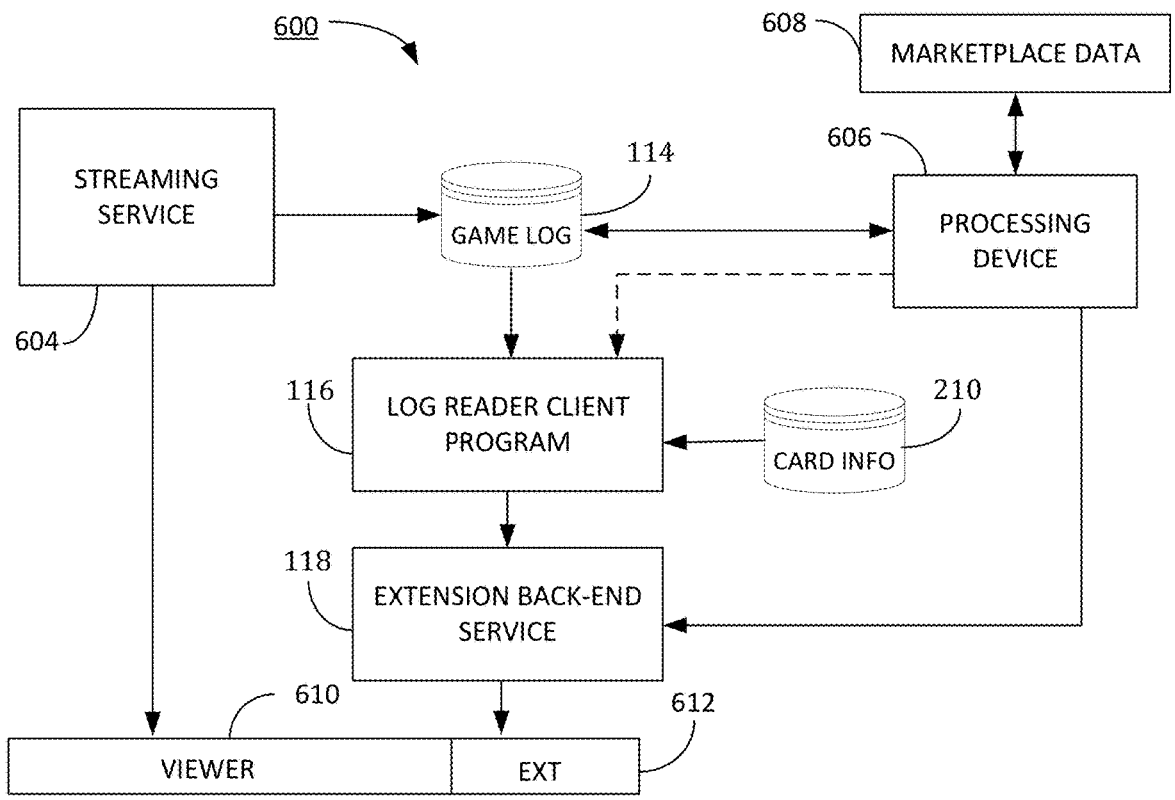
FIG. 18 illustrates a block diagram of one embodiment for including collectible card purchase data supplemental to a stream of fantasy card gameplay.

FIG. 18 illustrates one embodiment of system for supplementing a video stream for a fantasy card videogame. The system 600 operates similar to the system of FIGS. 1-3, but further facilitates a commercial transaction. The streaming service 604 is one or more processing platforms for distributing gameplay content, here being multiple players competing in an online fantasy card game. For example, two players can connect via an online gaming platform, that gameplay being sent via a streaming engine associated with the streaming service 604.

The game log 114 captures gameplay data from the streaming engine 604, as described above. The game log 114 operates with the log reader client program 116 and the card information database 210 to generate card information consistent with techniques described above. Additionally, the game log 114 further acquires card name data for the processing device 606. This card name data represents the name of a card being played within game from the streaming engine 604.

The processing device 606 receives this card name data. For example, the processing device 606 can perform a data pull operation to access the game log on a predetermined time interval. In another embodiment, the game log 114 can push the card name data to the processing device 606 at defined intervals.

As the price of a particular card can be controlled by market pricing, the processing device 606 communicates with a marketplace database 608 using the card name data. The marketplace database 608 includes market data relating to a card, such as current market prices, exclusivity of the card, recent commercial transactions, ownership authentications, quality authentications, and other data.

The marketplace database 608 may be any commercial database or commercial trading network location. For example, in one embodiment the commercial database 608 can be associated with an existing online platform for users to buy and sell gaming cards independent of streaming content. For example, one web-based location may be available from Card Kingdom, Inc. In another embodiment, the database 608 can be a dedicated network location for a specific fantasy card game, including where users can directly purchase game cards, game content, play videogames, etc.

The system 600 operates similar to the system 100 of FIG. 1 above, distributing videogame content to viewers via the game log 114 populated with gameplay content from the streaming service. The LRCP 116 processes data from the game log 114, including the example of card info from database 210. This content is submitted to the extension back-end service 118 for displaying supplemental content to a viewer viewing the livestream content.

In addition, the system 600 includes the processing device 606 generating an electronic offer display with the collectible card being available for purchase. This electronic offer display includes card purchase data allowing a viewer to undertake a commercial transaction. The card purchase data can include price information, card quality or rating information, recent market price trends, card uniqueness or general availability, card gameplay features, shipping or delivery time and costs, as well as other information. Additionally, the electronic offer display can include a link, button or other user interface element providing for a buyer to purchase the card. Moreover, the purchase of the card can be done directly within the processing system 600 or in another embodiment may be performed by accessing an external commercial transaction network location.

The processing device 606 generates this electronic offer display in a data format usable by the EBS 118. The processing device 606 transmits the electronic offer display to the EBS 118, where the EBS 118 is part of a viewer application associated with the streaming application viewing the video stream of the fantasy card game. Therefore, in FIG. 18, a viewer application 610 receives the streaming content and an extension 612 receives the electronic offer display.

Herein, the display of the electronic offer is viewable concurrent with the streaming content, tying together watching gameplay and an offer for an electronic purchase. The offer display includes a button, link, or other user interface element allowing the viewer of the streaming content to engage in the commercial transaction. As described in greater detail below, the commercial transaction can be conducted within the processing system 600 using local commercial processing techniques, or via a third party marketplace. In another embodiment, a third-party marketplace system may include an API or other connective application within the processing system 600 to facilitate the commercial transaction. The commercial transaction can include any number of varying embodiments, such as launching a separate window, separate segment of an existing window, updating the window having the electronic offer therein, by way of example. Moreover, the third-party marketplace can be a dedicated marketplace or can be a marketplace associated with or contained within a videogame platform itself.

Figure 19:
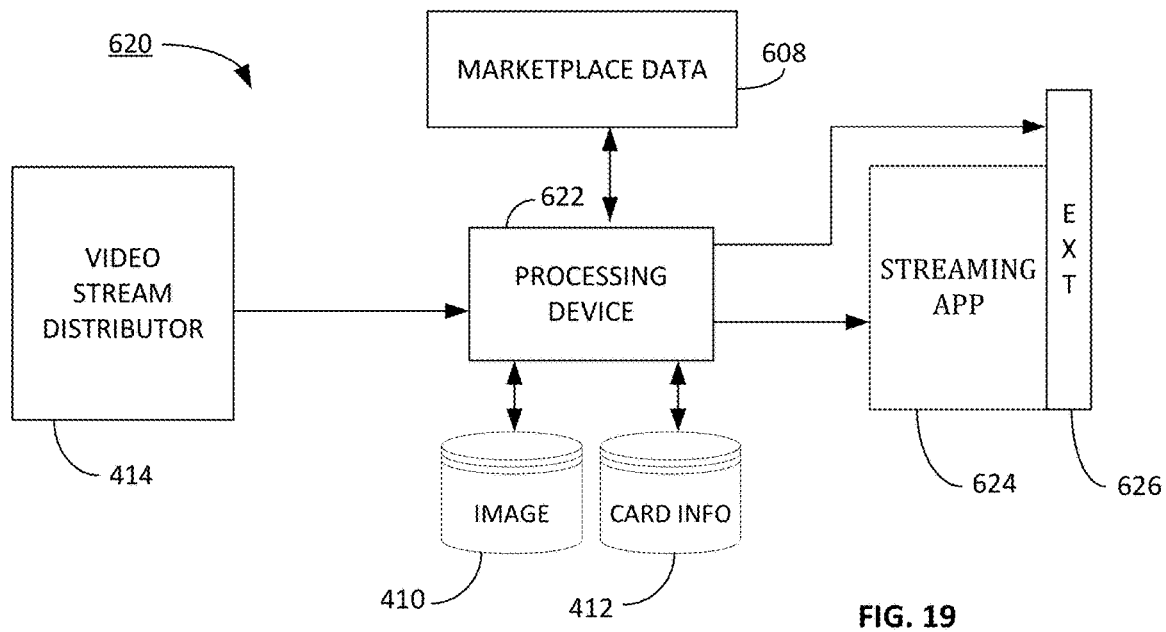
FIG. 19 illustrates a block diagram of another embodiment for including collectible card purchase data supplemental to a video stream of fantasy card gameplay.

FIG. 19 illustrates system 620 for in-person gameplay. The video stream distributor 414 operates similar as described above in FIG. 9 including sending video content to the processing device 408 with image recognition operations using an image database 410 and card information database 412 for detecting fantasy cards during gameplay.

Whereas, the system 620 further includes a processing device 622 performing processing operations for supplementing the video stream to facilitate a commercial transaction of collectible card purchases.

In this in-person gameplay video feed system 620, the processing device 622 determines cards being played within the gameplay using image recognition techniques described above. Upon determining a card being played, the processing device 622 then knows the card name data, such as from the card information database 412. Thus using the card name data from the game log, the processing device 622 accesses the marketplace database 608 similar to operations described above in FIG. 18. Therein, the processing device 622 generates the electronic offer display. A streaming application 624 receives the streaming content and a viewer extension receives the electronic offer display.

A viewer viewing the streaming gameplay content can then view the livestream in a streaming application and view the electronic offer display in an extension 626. In one embodiment, the electronic offer display includes an active link and the viewer can electronically purchase the collectible card without disruption of the livestream content. Herein, the electronic offer display for system 620 is similar to the electronic offer display for system 600 described above, including user interface and processing operations providing for either a commercial transaction from the system 620 or via a third-party marketplace.

Figure 20:
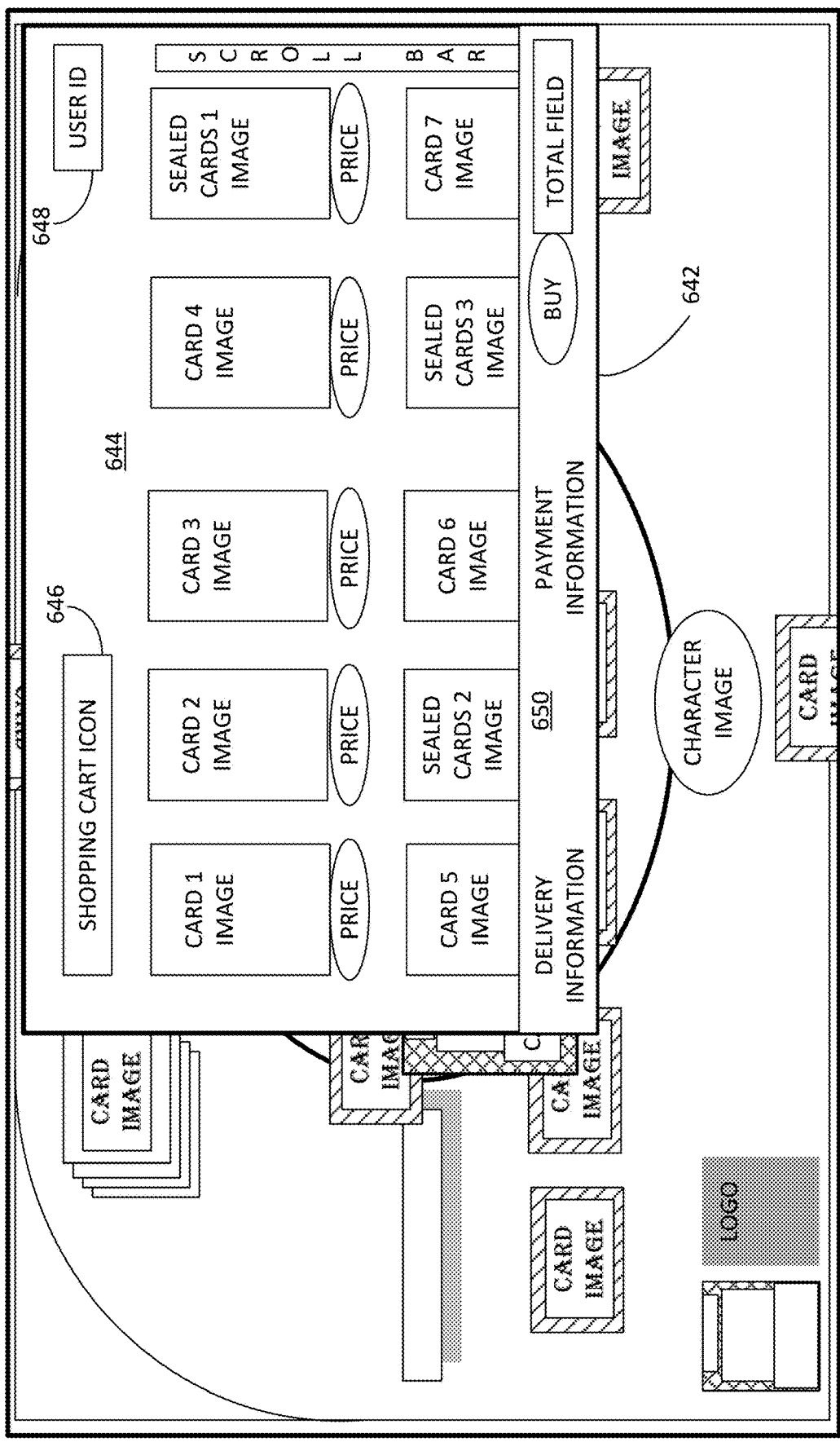
FIG. 20 illustrates an exemplary screenshot of gameplay with collectible card purchase data.

FIG. 20 illustrates a sample screenshot display of fantasy card gameplay. Similar to descriptions above, the fantasy card gameplay relates to fantasy-based card games using various gaming cards representing different gaming elements or characters to compete with another player. One example of a fantasy card game is Magic the Gathering®, where the gameplay can be an online videogame with livestream of active gameplay or a video stream of in-person gameplay with physical cards.

In the sample screenshot of FIG. 20, window 640 shows the fantasy card gameplay. Display 642, such as in an overlay display generated by the extension 612 of FIG. 18, provides the electronic offer display. Display 642 illustrates an exemplary display window with multiple card images 644, each having visible price information. In one embodiment, the card images 644 can be active displays allowing for not only card information, but up to date pricing information. For example, market prices can vary and the price information can include not only price information, but also price trending details.

A user interacting with the display 642 can select one or more card images 644 for actively purchasing the card concurrent with the streaming content visible in display 640. The display of card images 644 can include any number of cards, this example display using a scroll bar allowing the user to navigate the various cards available for purchase. The display of cards, in this example, includes both individual cards and sealed cards. While not expressly displayed, further collectible items can be available for purchase via this display 642.

The display 642 can include a shopping cart icon 646 and user id 648 as part of the commercial transaction. The shopping cart, consistent with known shopping cart techniques, can collect multiple cards for a single financial transaction. The user id 648 allows for coordinating the viewer/purchaser with a financial system to consummate the transaction.

The display 642 can also include financial transaction fields 650, such as a delivery field to indicate subsequent delivery of purchased cards, a payment field to indicate how the financial transaction is processed. One example of a payment field can be a designated credit card, a pre-existing credit account, a third-party payment processing system, e.g. Paypal®, by way of example. The transaction fields 650 can further include a button or active field to buy and complete the transaction as well as a running total to show the purchase price of selected card(s) 644.

Figure 21:
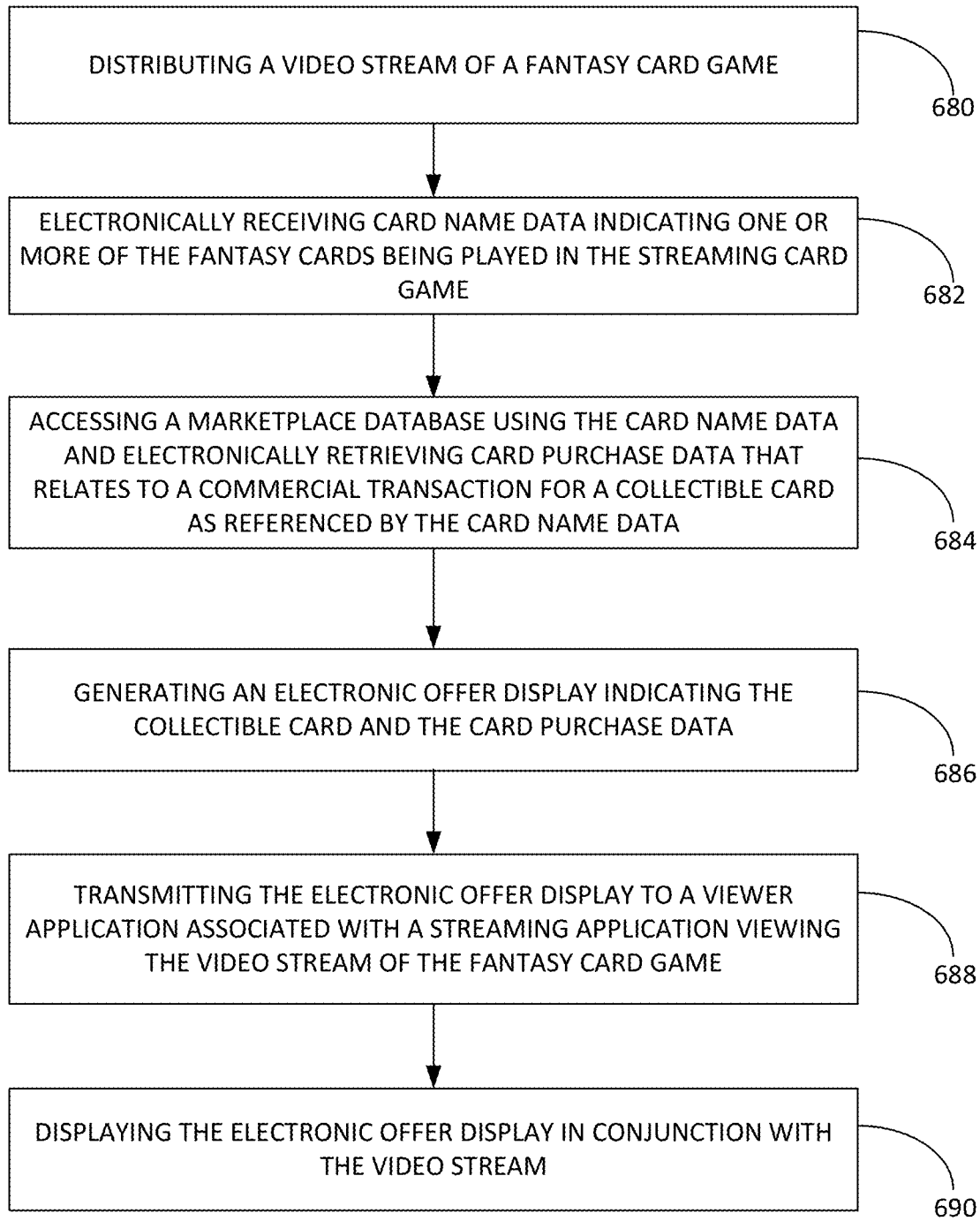
FIG. 21 illustrates a flowchart of steps of one embodiment for supplementing a video stream of fantasy card gameplay.

The method and system is executable within one or more processing devices across a local or networked computing environment. FIG. 21 is a flowchart of the steps of one embodiment of the present method and system supplementing gameplay content by facilitating a commercial transaction of a collectible card. The steps of FIG. 21 can be performed using the processing environments of FIG. 18 or 19.

Step 680 is distributing a video stream of a fantasy card game. This step can be performed consistent with the techniques described above. The video game stream can be in-person gameplay or videogame content. Additionally the video feed can be a live feed of active gameplay or can be recorded or time-delayed content.

Step 682 is electronically receiving card name data indicating one or more fantasy cards being played in the fantasy card game. For example, in one embodiment with a videogame the card name data can be from a game log and with a livestream of in-person gameplay, the card name data can be from a card detection engine.

Step 684 is electronically accessing a marketplace database using the card name data and electronically retrieving card purchase data therefrom. The card name data may be a data field or string of the name of the character. The card purchase data is data representing or relating a commercial transaction for a collectible card referenced by the card name data. As noted above, this card purchase data can include pricing, card quality or rating, among other information fields.

In one embodiment, determining which card purchase data to retrieve can be on referencing the card name data. This referencing can be based on which card or cards are actively being played in the game. Whereas, one embodiment does not necessarily require a specific one-to-one correlation of gameplay to offer for sale.

Rather, the referencing of a card based on card name data can include varying forms of reference, such as a name of fantasy game being played, a card type within the game, a version of the fantasy game, or other factors.

Step 686 is generating an electronic offer display indicating the collectible card and the card purchase data. The electronic offer display can include varying amounts of display information, such as the price and other commercial details. The electronic offer display further includes a link selectable by a viewer to directly engage or consummate the commercial transaction without disrupting the video stream content.

For example, one embodiment may include embedded instructions for completing the transaction. In one embodiment, the viewer may have profile data associated with viewing the streaming content. The embedded instructions can access this profile data as part of user verification information or payment information for completing the commercial transaction.

Step 688 is transmitting the electronic offer display to a viewer application associated with a streaming application providing the video stream of the fantasy card game. As noted in FIGS. 18-20, this display can be provided to a viewer extension, for example viewable in an overlay display. The display can also be in a separate browser or viewer window or a designated section of the viewer window itself.

Therein, step 690 is displaying the electronic offer display in conjunction with the video stream. As part of the viewing process, the viewer can select to purchase the collectible card. The purchase can be a one-click purchase or can transfer or otherwise engage further purchasing software for finalizing the transactions. In the method and system, different parties may receive referral fees for the commercial transactions, such as a streaming provider, game players, sponsors, a marketplace, etc. Therefore, in processing a payment, the system may extract the referral fee from the purchase price and redirect the referral fee payment.

Further referral fees or bonuses may be deducted, for example for a sponsor sponsoring the fantasy card game or one or more of the game players receiving a fee. Additionally, the processing platform may include a transaction cost. Whereby, the remaining balance for the transaction can then be submitted to the seller to complete the financial transaction. Herein, payments and transfers are performed electronically using known financial transfer protocols and security protocols.

In further embodiments, the streaming entity may select a specific marketplace for selling collectibles. These may be different entities, such as a game manufacturer that creates and distributes the fantasy game working with a trading or consumer marketplace. These entity may also be the same, such as a collectible marketplace providing or sponsoring streaming content to promoting buying and selling of collectibles.

In addition, the item or items for sale may include sealed packs of card products. As used herein, a sealed pack can be any suitable pre-packaged grouping of cards, such as either predetermined packaging or random groupings of cards. One example of a sealed pack can be a package generally known as a booster pack. Booster packs typically contain a random selection of fantasy game cards, the purchaser hoping to expand his or her card deck and leaving the specific cards received to chance. Another type of a sealed pack can be a starter deck designed for the purchaser to begin assembling fantasy game cards. Sealed packs can also include specific cards or cards types, for example a curated packaging of cards. As used herein, a sealed pack generally relates to any pre-packaged collection of cards.

In one embodiment, the processing platform that generates the overlay and content functions may provide its own marketplace information. This can operate similar to the embodiments of FIGS. 18-19 above, with the platform including further operations to better track and refine the market pricing information.

For example, a processing device can actively track market data for collectibles, including processing operations of API operations to tracks user activities, screen scraping techniques, as well as other data collection techniques. The processing system further may utilize actively gameplay data acquired via the game log, including for example the number of active plays of a particular card and number of times the card was part of a winning campaign.

In a further embodiment, additional parties may offer cards for sale, including for example individuals or third-parties. In one example, an individual may seek to sell individual cards using the system of FIGS. 18-19. This seller can register the cards via a connected commercial marketplace and allow the marketplace to facilitate the commercial transaction. In another embodiment, the seller can submit the card information to the system, such as processing device 606 of FIG. 18 or processing device 622 of FIG. 19. Using techniques described above, the method and system can then complete the commercial transaction where the seller can be charged with ensuring final card delivery to the purchaser.

In one embodiment, a factor for determining a collectible card referenced by the card name data can include user interaction functions with the overlay system showing gameplay. FIGS. 1-17 illustrate displaying the supplemental card and game content, as well as allowing for user interactions. The present method and system can track user interactions with various cards or gameplay events. These interactions can determine popularity of cards, which can further influence determining the collectible card referenced by the card name data. For example, if tracking indicates a high user interaction with a specific card, the system may prioritize referencing this card for a commercial transaction based on the card name data being played in the game.

As noted as to FIGS. 1-17 above, the overlay display includes viewer interactions. Therefor further data collection can include tracking the number of and type of user interactions with card data overlay displays. For example, if a display of a card garners a high degree of user interaction, that may indicate a greater degree of popularity to be reflected in a market price. Further data can include social media or news topics relating to particular fantasy games or cards.

Whereby, in this embodiment, the processing system can supplement market data with user engagement and interaction data generally relating to fantasy cards.

The market pricing information and updating can be delayed or done in a real time fashion. For example, real time processing can include timed interval access to content database. Using the example of how often a card is played, a general tracking database may be tracking a large number of active games, each with unique card play. After a set number of games, for example 20 matches, the processing device may re-iterate its calculations or analysis of marketplace data for card pricing information, such as increasing a price for a more popular card.

In a further embodiment, the method and system may include additional processing for further facilitating the commercial transaction. One embodiment may include using a local or user-verified wallet for the commercial transaction. The wallet may include known protocols for holding and verifying funds. One embodiment may include using or facilitating cryptocurrency transactions. The processing system may integrate or communicate with a cryptocurrency processing system to allow the viewer to complete the transaction using cryptocurrency.

In one embodiment, the overlay and viewer display information can include purchase information. For example, as viewers are watching the gameplay, the supplementary viewer window can include a pop-up display or secondary display portion that gives a notification of any new or recent purchases. One example can be a push notification to the viewers on the platform that a specific user has just purchased a specific collectible.

In another embodiment, the collectible being purchased can also relate beyond the card being played directly in the game. For example, a collectible can relate to a particular game or event, such as a commemorative card. A particular fantasy card tournament may include one or more commemorative cards that may or may not be specific to gameplay, e.g. a character in the game. Viewers can seek to purchase these items through the supplemental viewer application noted above.

In addition, as the processing platform described herein is a central gateway for the commercial transaction, the system can additionally record and track not only user interactions with card data, but commercial transactions. This tracking data provides a holistic view to user viewing engagements to fantasy card games. As described in one embodiment above, this information can be used to better assess market price for cards.

Similarly, as the platform manages transactions, the platform can additionally provide a blockchain or other type of data recording structure for tracking ownerships of specific cards. In this example, a blockchain recordation tracking ownership can validate provenance of a card, adding a further layer of security on the market price.

Therein, the method and system helps facilitate commercial transactions concurrent with streaming content of a fantasy card game.

FIGS. 1 through 21 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. As used herein, executable operations and executable instructions can be performed based on transmission to one or more processing devices via storage in a non-transitory computer readable medium.

What is claimed is:

1. A computerized method for supplementing a video stream of a fantasy card videogame from a videogame streaming engine, the method comprising:
   electronically accessing the videogame streaming engine and acquiring, via a networked connection, card name data indicating at least one of the plurality fantasy cards being played in the fantasy card videogame of a video stream;
   electronically accessing a marketplace database, via the networked connection, using the card name data and electronically retrieving card purchase data therefrom, the card purchase data relating to a commercial transaction for a collectible card referenced by the card name data;
   generating an electronic offer display indicating the collectible card and the card purchase data;
   via the networked connection, electronically transmitting the electronic offer display to a viewer application associated with a streaming application providing the video stream of the fantasy card videogame; and
   displaying the electronic offer display on a user display device in conjunction with a display of the video stream on the display device.

2. The method of claim 1, wherein the display of the electronic offer display includes providing for an electronic purchase of the collectible card.

3. The method of claim 2, wherein the card purchase data includes embedded instructions for completing the commercial transaction to electronically purchase the collectible card.

4. The method of claim 3 further comprising:
   storing profile data for a viewer viewing the video stream; and
   accessing the profile data as part of the embedded instructions for completing the commercial transaction.

5. The method of claim 2, where the electronic purchase of the collectible card is within a processing system including transmitting the electronic offer display to the viewer application.

6. The method of claim 2, wherein the electronic purchase of the collectible card is within an external commercial marketplace.

7. The method of claim 1 wherein the card purchase data includes market price data and card quality rating data.

8. The method of claim 1 further comprising:
   receiving a user engagement of the electronic offer including providing payment for purchasing the collectible card;
   processing a referral fee to a video stream operator as a referral fee.

9. The method of claim 1, wherein the display of the electronic offer display is an overlay window associated with the viewer application.

10. The method of claim 1, wherein the collectible card is a physical card.

11. The method of claim 1, wherein the collectible card is an electronic card.

12. The method of claim 1, wherein the collectible card is a sealed pack.

13. The method of claim 1, wherein the collectible card is a game memorabilia item.

14. A computerized method for supplementing a video stream of a fantasy card game from a video stream engine, the method comprising:
   electronically accessing the videogame streaming engine and acquiring, via a networked connection, card name data from a game log, the card name data indicating at least one of the plurality fantasy cards being played in the fantasy card game of the video stream, the fantasy card game being a videogame;
   electronically accessing a marketplace database, via the networked connection, using the card name data and electronically retrieving card purchase data therefrom, the card purchase data relating to a commercial transaction for a collectible card referenced by the card name data, wherein the collectible card is an electronic card;
   generating an electronic offer display indicating the collectible card and the card purchase data;
   via the networked connection, electronically transmitting the electronic offer display to a viewer application associated with a streaming application providing the video stream of the fantasy card game; and
   displaying the electronic offer display on a user display device in conjunction with a display of the video stream on the display device, wherein the display of the electronic offer display includes providing for an electronic purchase of the collectible card.

15. The method of claim 14, where the electronic purchase of the collectible card is within a processing system including the video stream engine.

16. The method of claim 14, wherein the electronic purchase of the collectible card is within an external commercial marketplace.

17. A computerized system for supplementing a video stream of a fantasy card videogame from a videogame streaming engine, the system comprising:
   a processing device, in response to executable instructions from a computer readable medium operative to:
      electronically accessing the videogame streaming engine and acquiring, via a networked connection, card name data indicating at least one of the plurality fantasy cards being played in the fantasy card videogame of a video stream;
      electronically access a marketplace database, via the networked connection, using the card name data and electronically retrieving card purchase data therefrom, the card purchase data relating to a commercial transaction for a collectible card referenced by the card name data;
      generate an electronic offer display indicating the collectible card and the card purchase data;
      via the networked connection, electronically transmit the electronic offer display to a viewer application associated with a streaming application providing the video stream of the fantasy card videogame; and
      display the electronic offer display on a user display device in conjunction with a display of the video stream on the display device.

18. The system of claim 17, wherein the display of the electronic offer display includes providing for an electronic purchase of the collectible card.

19. The system of claim 18, wherein the card purchase data includes embedded instructions for completing the commercial transaction to electronically purchase the collectible card.

20. The system of claim 17, wherein the collectible card is at least one of: a physical card, an electronic card, a sealed pack, and a game memorabilia item.

\* \* \* \* \*